(12) United States Patent
Kanenari et al.

(10) Patent No.: US 8,707,778 B2
(45) Date of Patent: Apr. 29, 2014

(54) TRANSMISSION DEVICE FOR TRANSMITTING INFORMATION ABOUT TIRE CONDITION AND TIRE CONDITION MONITORING SYSTEM

(75) Inventors: Daisuke Kanenari, Hiratsuka (JP); Yasuhiko Araki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 175 days.

(21) Appl. No.: 13/509,440

(22) PCT Filed: Nov. 10, 2010

(86) PCT No.: PCT/JP2010/006598
§ 371 (c)(1),
(2), (4) Date: May 11, 2012

(87) PCT Pub. No.: WO2011/058743
PCT Pub. Date: May 19, 2011

(65) Prior Publication Data
US 2012/0222478 A1  Sep. 6, 2012

(30) Foreign Application Priority Data

Nov. 16, 2009 (JP) ................................ 2009-260697
Nov. 16, 2009 (JP) ................................ 2009-261035
Jul. 1, 2010 (JP) ................................ 2010-150941
Jul. 20, 2010 (JP) ................................ 2010-162779

(51) Int. Cl.
*B60C 23/02* (2006.01)
*B60C 23/04* (2006.01)

(52) U.S. Cl.
CPC ......... *B60C 23/0408* (2013.01); *B60C 23/0494* (2013.01); *B60C 23/0452* (2013.01)
USPC ...................................................... 73/146.8

(58) Field of Classification Search
CPC ............ B60C 23/0454; B60C 23/0457; B60C 23/0459; B60C 23/0464; B60C 23/0477; B60C 23/0483; B60C 23/0486; B60C 23/0498; B60C 23/06; B60C 23/061; B60C 23/066; B60C 23/12; B60C 23/20; B60C 99/00; G01M 17/02; G01M 17/025; G01M 17/022; G01M 17/065
USPC .................................................. 73/146–146.8
See application file for complete search history.

(56) References Cited

U.S. PATENT DOCUMENTS 6,160,474 A * 12/2000 Tsunetomi et al. ........... 340/442
6,647,772 B2 * 11/2003 Ito et al. ......................... 73/146
(Continued)

FOREIGN PATENT DOCUMENTS

EP  0 985 560 A2  3/2000
FR  2 884 610 A1  10/2006
(Continued)

OTHER PUBLICATIONS

Japanese Office Action of the corresponding Chinese patent application No. 2010-238134, dated Aug. 13, 2013.
(Continued)

*Primary Examiner* — Andre Allen
(74) *Attorney, Agent, or Firm* — Global IP Counselors, LLP

(57) ABSTRACT

A tire condition monitoring system includes a transmission device, a receiving device, and a monitoring section. The transmission device includes a sensor which detects a condition of gas in a tire cavity area surrounded with a tire and a rim as tire information, a transmitter which wirelessly transmits the tire information, and a housing which houses the sensor and the transmitter. An opening portion of an air vent connecting a housing inner space and the cavity area is formed on top of a protruding portion protruding from the surface of the housing. An area of the opening portion is 0.4 mm² or smaller. An area of contact between the top portion and a contact plane in contact with the top portion and perpendicular to a protruding direction of the protruding portion is not larger than 30% of the opening portion area.

24 Claims, 17 Drawing Sheets

(56) References Cited

U.S. PATENT DOCUMENTS

| | | | |
|---|---|---|---|
| 7,145,443 B2 * | 12/2006 | Ito et al. | 340/442 |
| 7,281,421 B2 * | 10/2007 | Yin et al. | 73/146.8 |
| 2005/0092076 A1 | 5/2005 | Uleski et al. | |
| 2009/0205435 A1 | 8/2009 | Buck et al. | |
| 2010/0024539 A1 | 2/2010 | Hamm et al. | |
| 2012/0017672 A1 * | 1/2012 | Uh et al. | 73/146.8 |

FOREIGN PATENT DOCUMENTS

| | | |
|---|---|---|
| JP | 2002-144830 A | 5/2002 |
| JP | 2007-196834 A | 8/2007 |
| JP | 2007-196834 A | 8/2007 |
| JP | 2008-062730 A | 3/2008 |
| JP | 2009-184412 A | 8/2009 |
| WO | WO-2008/017537 A2 | 2/2008 |

OTHER PUBLICATIONS

International Search Report of corresponding International Application No. PCT/JP2010/006598, dated on Feb. 10, 2010.

Japanese Office Action of the corresponding Japanese Application No. 2009-260697, dated May 18, 2010.

Taiwanese Office Action of the corresponding Taiwanese patent application No. 099139372, dated Dec. 24, 2013.

* cited by examiner

DIRECTION OF TIRE ROTATION AXIS

TRANSMISSION DEVICE FOR TRANSMITTING INFORMATION ABOUT TIRE CONDITION AND TIRE CONDITION MONITORING SYSTEM

CROSS-REFERENCE TO RELATED APPLICATIONS

This U.S. National stage application claims priority under 35 U.S.C. §119(a) to Japanese Patent Application No. 2009-260697, filed in Japan on Nov. 16, 2009, to Japanese Patent Application No. 2009-261035, filed in Japan on Nov. 16, 2009, to Japanese Patent Application No. 2010-150941, filed in Japan on Jul. 1, 2010 and to Japanese Patent Application No. 2010-162779, filed in Japan on Jul. 20, 2010, the entire contents of Japanese Patent Application No. 2009-260697, Japanese Patent Application No. 2009-261035, Japanese Patent Application No. 2010-150941 and Japanese Patent Application No. 2010-162779 are hereby incorporated herein by reference.

BACKGROUND

1. Field of the Invention

The present invention relates to a transmission device provided in a tire cavity area to transmit tire information about a tire condition and a tire condition monitoring system for determining whether a tire anomaly is caused.

2. Background Information

Conventionally, a check and control of air pressure of a tire mounted to a vehicle are desired for improvement of tire durability, improvement of wear resistance, improvement of fuel economy, or improvement of ride quality, and improvement of handling performance. For this purpose, various systems for monitoring tire pressure have been proposed. In such a system, in general, information about the air pressure of the tire mounted to a wheel is detected, a transmission device for transmitting the information is provided in a tire cavity area of each wheel, and the information of the air pressure of each tire is obtained from the transmission device to monitor the air pressure of the tire.

On the other hand, when a tire goes flat, a puncture repair agent to be injected into a tire cavity area located between the tire and a rim is often used. Because the puncture repair agent is a liquid, the agent adheres to the transmission device provided in the tire cavity area as well as a tire inner surface facing the tire cavity area when the agent is injected into the tire cavity area. In some cases, the agent becomes solidified to close an opening portion formed in the transmission device to affect measurement of the air pressure.

To cope with this problem, a wheel condition detection device capable of maintaining a normal detection condition by preventing entry of foreign matter through a communication portion for detection has been proposed (Japanese Patent Application Laid-Open No. 2008-62730).

To put it concretely, a TPMS (Tire Pressure Monitoring System) valve of the wheel condition detection device is provided with a communication portion opening and closing mechanism for opening and closing a communication hole formed in a housing. At the time of puncture repair, entry of the puncture repair agent into a detection space through the communication hole is prevented. This communication portion opening and closing mechanism is made up of mechanical bodies including a lid body and a torsion coil spring and automatically opens and closes the communication hole by centrifugal force acting on a wheel.

Moreover, there are proposed a tire pressure monitoring system and a tire pressure sensor unit for informing an occupant that tire pressure may drop after a punctured tire is fixed by using a tire puncture repair agent (Japanese Patent Application Laid-Open No. 2007-196834).

To put it concretely, the tire pressure monitoring system is provided to each tire of a vehicle and is provided with a sensor unit having a tire pressure sensor and a transmitter, a receiving device for receiving a radio wave from the sensor unit, and a control ECU for giving an alarm when the air pressure of each tire becomes lower than or equal to a threshold value. The system is provided with a puncture determination means for determining puncture of each tire and a puncture repair agent use determination means for determining whether or not the punctured tire was repaired by using the puncture repair agent after it was determined that the tire blew out. When it was determined that the punctured tire was repaired by using the puncture repair agent, the control ECU continues the alarm even if the tire pressure value from the air pressure sensor is a normal value.

Because the communication portion opening and closing mechanism of the device described in Japanese Patent Application Laid-Open No. 2008-62730 is made up of the mechanical bodies including the lid body and the torsion coil spring, the device itself is complicated and expensive.

In the system and the unit described in Japanese Patent Application Laid-Open No. 2007-196834, it is not certain whether or not the information about the tire pressure measured after the repair of the tire by using the puncture repair agent is correct. Therefore, it is impossible to determine whether a tire anomaly after the puncture repair is caused.

SUMMARY OF THE INVENTION

Therefore, an object of the present invention is to provide a transmission device capable of appropriately detecting and transmitting tire information such as tire pressure information even after tire puncture repair by using a puncture repair agent and a tire condition monitoring system for determining whether a tire anomaly is caused.

According to a first aspect of the invention, there is provided a transmission device provided in a tire cavity area to transmit tire information about a condition of a tire.

The device includes:

a sensor which detects a condition of gas filled in the tire cavity area surrounded with the tire and a rim as the tire information;

a transmitter which wirelessly transmits the detected tire information; and a housing which houses the sensor and the transmitter.

An opening portion of an air vent connecting an inner space of the housing and the tire cavity area is formed on a surface of the housing.

The opening portion is formed on a top portion of a protruding portion protruding in one direction from the surface of the housing and has an area of 0.4 $mm^2$ or smaller.

Height of the protruding portion is 1 mm or greater.

When a contact plane in contact with the top portion and perpendicular to a protruding direction of the protruding portion exists, an area of a contact portion between the contact plane and the top portion is not larger than 30% of the area of the opening portion.

In a section profile of the protruding portion taken along a plane parallel to the protruding direction of the protruding portion and passing through a center of the opening portion, an inclination angle of a line segment with respect to the surface of the housing is preferably not smaller than 30 degree and smaller than 90 degree, the line segment being obtained by connecting a position of a base portion of the protruding portion and a position of the top portion and outmost from the center with an assumed straight line.

The opening portion is an outer opening end of the air vent facing the tire cavity area and, when the opening portion is referred to as an outer opening portion, an inner opening portion of the air vent facing the inner space preferably has a larger opening area than the outer opening portion.

Furthermore, a protecting wall whose height is 70% to 130% of the height of the protruding portion from the surface of the housing is preferably provided to the surface of the housing.

A recessed portion is formed by partially recessing the housing and the protruding portion is provided to the recessed portion, and depth of the recessed portion is 70% to 130% of the height of the protruding portion.

According to a second aspect of the invention, there is provided a tire condition monitoring system.

The system includes: a transmission device; a receiving device; and a monitoring section.

The transmission device includes a sensor which detects a condition of gas filled in a tire cavity area surrounded with a tire and a rim as tire information, a transmitter which wirelessly transmits the detected tire information, and a housing which houses the sensor and the transmitter.

An opening portion of an air vent connecting an inner space of the housing and the tire cavity area is formed in a surface of the housing.

The opening portion is formed on a top portion of a protruding portion protruding in one direction from the surface of the housing and has an area of 0.4 mm$^2$ or smaller.
Height of the protruding portion is 1 mm or greater.
When a contact plane in contact with the top portion and perpendicular to a protruding direction of the protruding portion exists, an area of a contact portion between the contact plane and the top portion is not larger than 30% of the area of the opening portion.
The receiving device receives the tire information transmitted from the transmitter.
The monitoring section determines whether a tire anomaly is caused and informs a determination result based on the tire information.

DETAILED DESCRIPTION OF EMBODIMENTS

A transmission device and a tire condition monitoring system of the present invention will be described below in detail.

Figure 1:
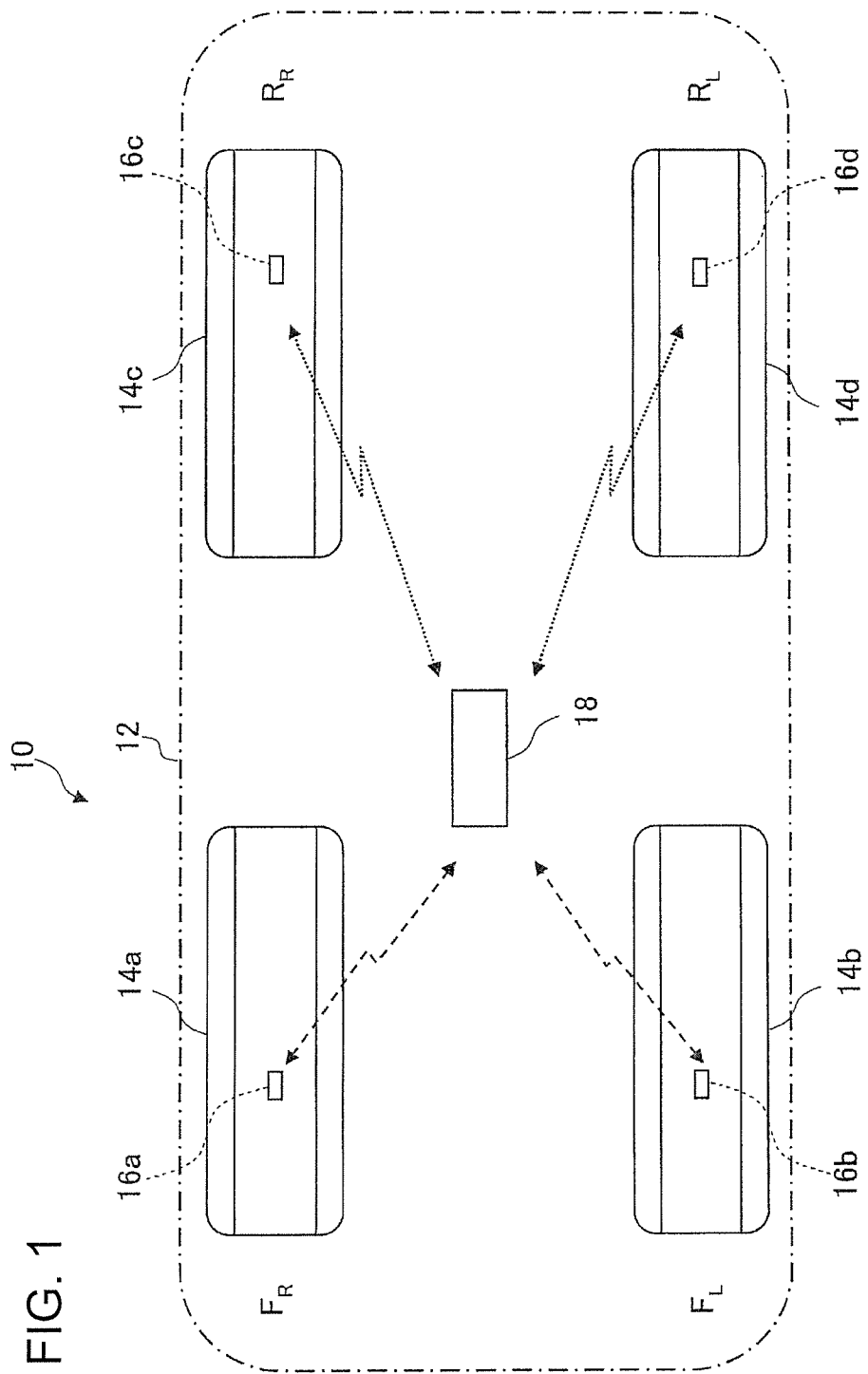
FIG. 1 is a general overview diagram of a tire pressure monitoring system which is a first embodiment of a tire condition monitoring system.

FIG. 1 is a general overview diagram of a tire pressure monitoring system 10 which is an embodiment of the tire condition monitoring system.

The tire pressure monitoring system (hereafter referred to as "system") 10 is mounted on a vehicle 12. The system 10 includes air pressure information transmission devices (hereafter referred to as "transmission devices") 16a, 16b, 16c, and 16d provided in respective tire cavity areas in tires 14a, 14b, 14c, and 14d of respective wheels of the vehicle 12 and a monitoring device 18.

All of the transmission devices 16a, 16b, 16c, and 16d detect information about pressure of air filled into the tire cavity areas surrounded with the tires and rims as tire information and wirelessly transmit the tire information to the monitoring device 18. Hereafter, to explain all of the transmission devices 16a, 16b, 16c, and 16d at a time, the transmission devices 16a, 16b, 16c, and 16d will be collectively referred to as transmission devices 16.

Figure 2:
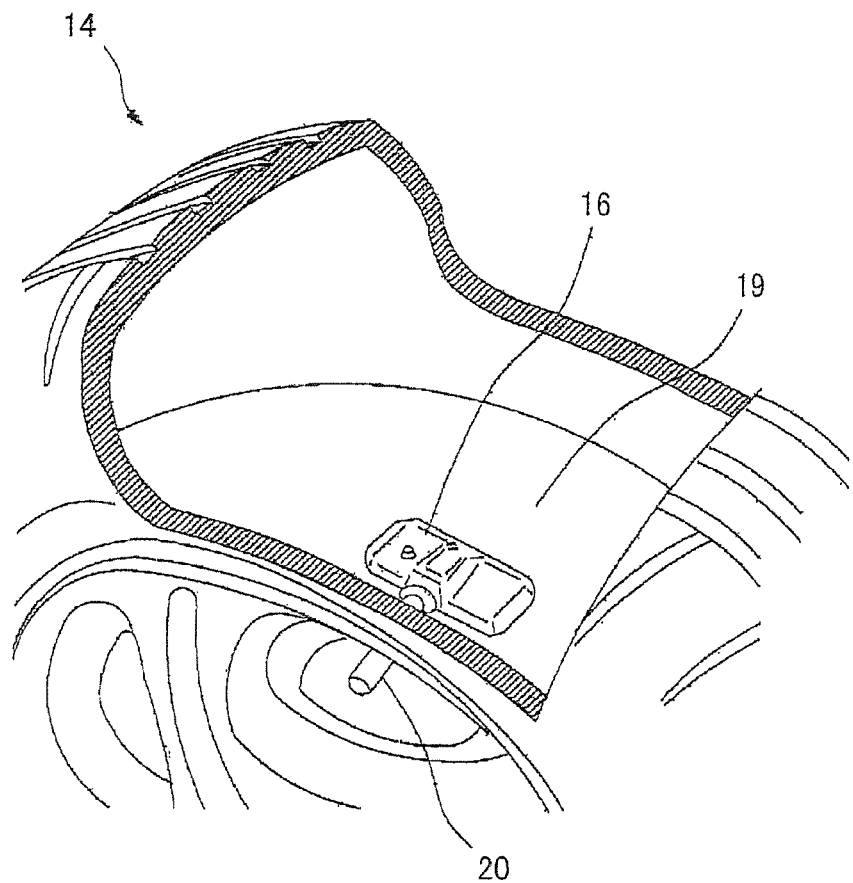
FIG. 2 is a drawing for explaining an example of a method for fixing a transmission device illustrated in FIG. 1 in a tire cavity area.
Figure 3:
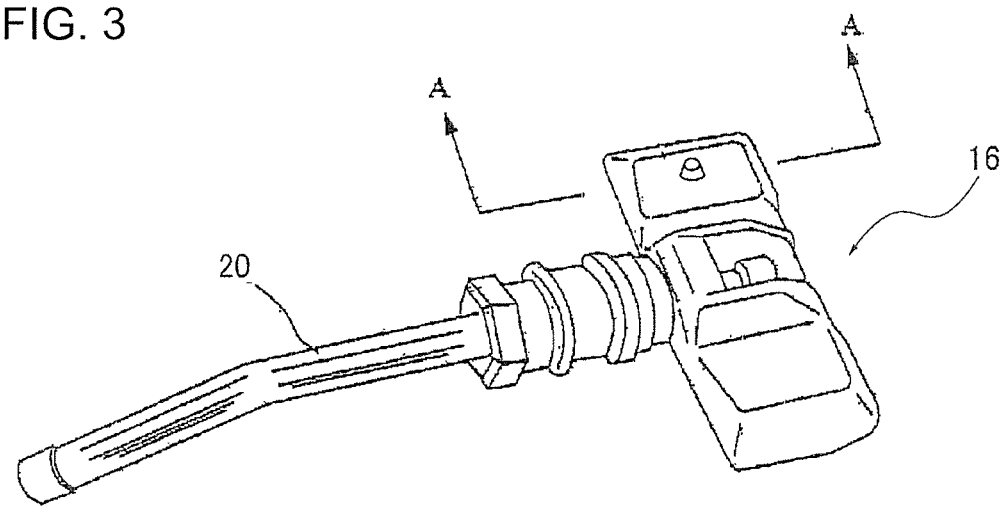
FIG. 3 is a perspective view of an entire device in which a transmission device illustrated in FIG. 2 is integrated with a tire valve.

FIG. 2 is a drawing for explaining an example of a method for fixing the transmission device 16 in the tire cavity area. FIG. 3 is a perspective view of an entire device in which the transmission device 16 illustrated in FIG. 2 is integrated with a tire valve 20.

The transmission device 16 is provided to an end portion of the tire valve 20 extending on a side of the tire cavity area and is fixed and disposed in the tire cavity area by mechanically fixing the tire valve 20 to the rim 19.

Figure 4:
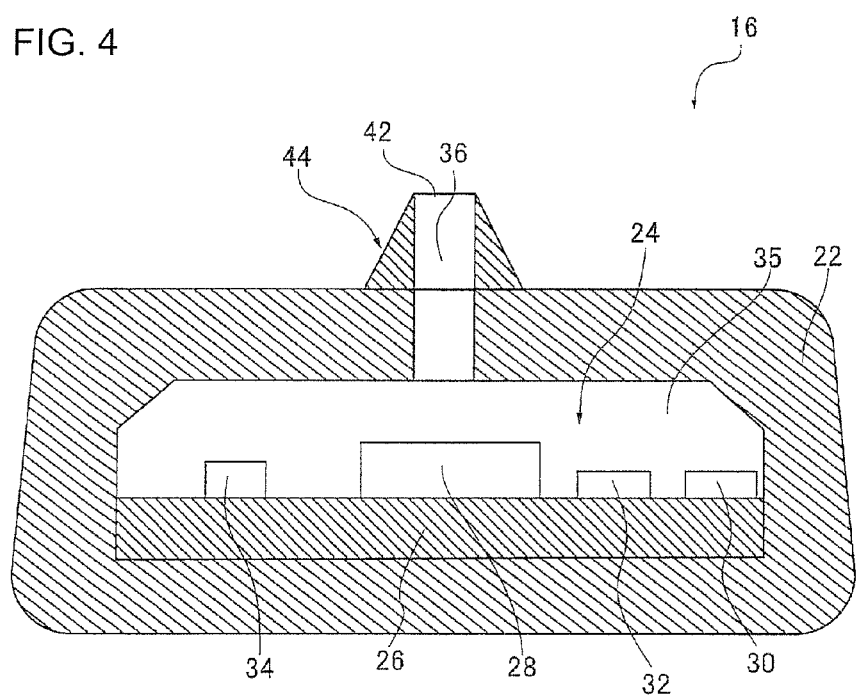
FIG. 4 is a sectional view of the transmission device taken along a line of A-A illustrated in FIG. 3.

FIG. 4 is a sectional view of the transmission device 16 along a line of A-A illustrated in FIG. 3. As illustrated in FIG. 4, the transmission device 16 includes a housing 22 and a circuit 24 provided in the housing 22. The circuit 24 includes a substrate 26 and a sensor unit 28, a transmitter 30, a processing unit 32, a power supply section 34, and an antenna 40 (see FIG. 5) provided to the substrate 26.

Figure 5:
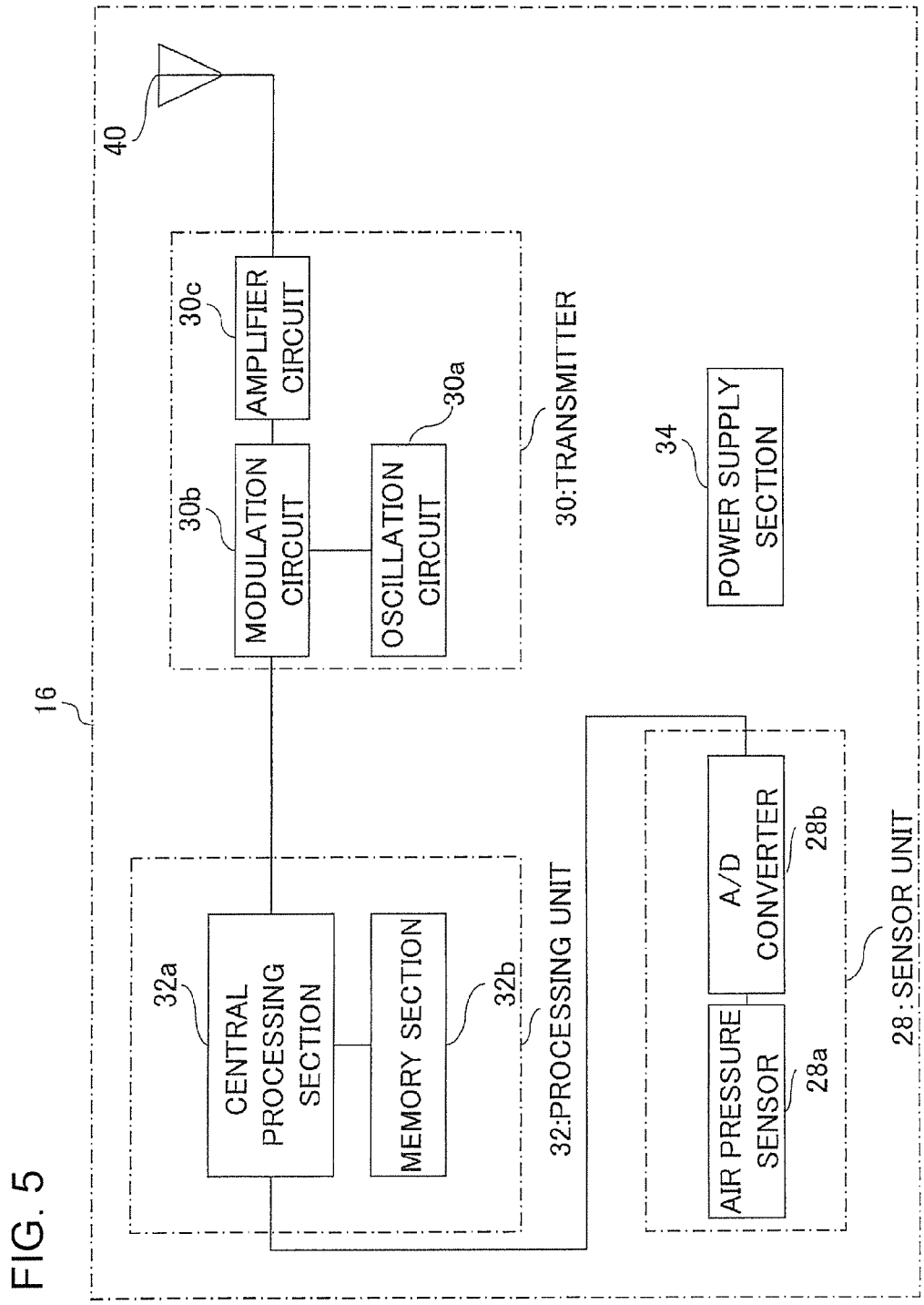
FIG. 5 is a circuit block diagram of the transmission device illustrated in FIG. 1.

FIG. 5 is a circuit block diagram of the transmission device 16.

The sensor unit 28 includes an air pressure sensor 28a and an A/D converter 28b. The air pressure sensor 28a senses the air pressure in an inner space 35 in the housing 22 and outputs a pressure signal. The inner space 35 in the housing 22 communicates with the space in the tire cavity area through an air vent 36 passing through the housing 22 and an opening portion 42 (see FIG. 4).

The A/D converter 28b carries out digital conversion of the pressure signal output from the air pressure sensor 28a and outputs pressure data.

The processing unit 32 includes a central processing section 32a and a memory section 32b. The central processing section 32a operates based on a program stored in a semiconductor memory of the memory section 32b. When the central processing section 32a is powered and driven, it carries out control so that the pressure data, which is information about the air pressure and sent from the sensor unit 28, is transmitted to the monitoring device 18 via the transmitter 30 at predetermined time intervals, e.g., every five minutes. Identification information unique to the transmission device 16 is stored in advance in the memory section 32b and the central processing section 32a carries out control so that the identification information is transmitted to the monitoring device 18 together with the pressure data.

The memory section 32b includes a ROM for storing the program for operation of the central processing section 32a and rewritable nonvolatile memory such as an EEPROM. The identification information unique to the transmission device 16 is stored in an unwritable area in the memory section 32b.

The transmitter 30 includes an oscillation circuit 30a, a modulation circuit 30b, and an amplifier circuit 30c.

The oscillation circuit 30a generates a carrier signal, e.g., an RF signal belonging to a 315 MHz frequency band.

The modulation circuit 30b modulates the carrier signal by using the pressure data sent from the central processing section 32a and the identification information unique to the transmission device 16 to generate a transmitting signal. As a modulation method, a method such as amplitude shift keying (ASK), frequency modulation (FM), frequency shift keying (FSK), phase modulation (PM), and phase shift keying (PSK) can be used.

The amplifier circuit 30c amplifies the transmitting signal generated by the modulation circuit 30b and wirelessly transmits the transmitting signal to the monitoring device 18 via the antenna 40.

A secondary battery, for example, is used as the power supply section 34 to almost permanently supply electric power to the sensor unit 28, the transmitter 30, and the processing unit 32.

Formed in a surface of the housing 22 housing such a circuit 24 is the opening portion 42 connecting the inner space 35 in the housing 22 and the tire cavity area as illustrated in FIG. 4.

The opening portion 42 is formed on a top portion of a protruding portion 44 protruding radially outward (upward in FIG. 4) from the surface of the housing 22 and the air vent 36 extends from the opening portion 42 to pass through the protruding portion 44.

The opening portion 42 and the protruding portion 44 will be described later.

Although the transmission device 16 in the embodiment detects the pressure of the air filled in the tire cavity area as a condition of the tire, the condition of the tire to be detected may include temperature of the air in the tire cavity area as well as the air pressure.

Moreover, the transmission device 16 may not only be fixed to the tire valve 20 but also be fixed directly to an inner surface of the tire which faces the tire cavity area or to a surface of the rim 19 which faces the tire cavity area.

Figure 6:
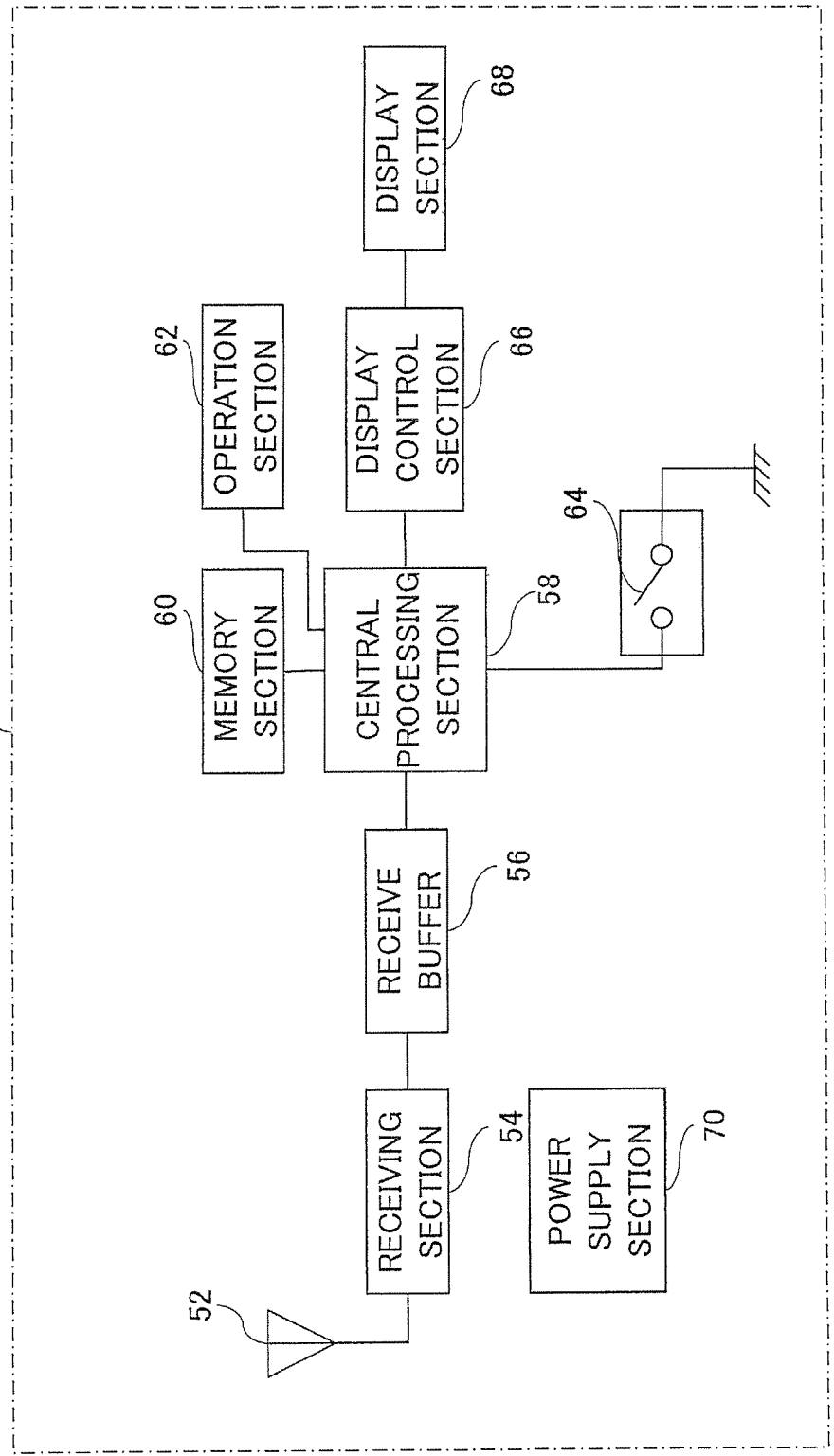
FIG. 6 is a circuit block diagram of a monitoring device illustrated in FIG. 1.

FIG. 6 is a circuit block diagram of the monitoring device 18.

The monitoring device 18 is installed in front of a position of a driver's seat of the vehicle 12, for example, and informs a driver of the information about the air pressure. The monitoring device 18 includes an antenna 52, a receiving section 54, a receive buffer 56, a central processing section 58, a memory section 60, an operation section 62, a switch 64, a display control section 66, a display section 68, and a power supply section 70.

Frequency of the antenna 52 is matched to transmit frequency of the transmission device 16 and the antenna 52 is connected to the receiving section 54.

The receiving section 54 receives the transmitting signal of a predetermined frequency and sent from the transmission device 16 and demodulates the signal to take out the pressure data and the data of the identification information. These pieces of data are output to the receive buffer 56.

The receive buffer 56 temporarily stores the pressure data and the data of the identification information output from the receiving section 54. The stored pressure data and the data of the identification information are output to the central processing section 58 according to a direction of the central processing section 58.

The central processing section 58 is mainly made up of a CPU and operates based on a program stored in the memory section 60. The central processing section 58 monitors the air pressure of each of the tires 14a to 14d for each piece of identification information based on the received pressure data and data of the identification information. To put it concretely, the central processing section 58 determines whether a tire anomaly is caused based on the pressure data and informs a determination result. Determination of whether the tire anomaly is caused is to determine whether or not the air pressure dropped to an abnormally low level or dropped sharply in a short period of time to show that the tire blew out, for example.

The central processing section 58 outputs a determination result to the display control section 66 and causes the display section 68 to output the determination result through the display control section 66.

Furthermore, the central processing section 58 initializes a communication method and the like with the transmission device 16 according to information from the operation section 62 and information from the switch 64. Moreover, the central processing section 58 can set determination conditions for determining whether the tire anomaly is caused according to the information from the operation section 62.

The memory section 60 includes a ROM for storing the program for operation of the CPU of the central processing section 58 and a nonvolatile memory such as an EEPROM. A table of the communication method with the transmission device 16 is stored in the memory section 60 during manufacture. The transmission device 16 and the monitoring device 18 communicate with each other by the above-described communication method at an early stage. The communication method table includes information such as a communication protocol, a transmission bit rate, and a data format corresponding to the identification information unique to the transmission device 16. Settings of these pieces of information can be more freely changed by means of input from the operation section 62.

The operation section 62 includes an input device such as a keyboard and is used to input various kinds of information and conditions. The switch 64 is used to direct the central processing section 58 to start initialization.

The display control section 66 controls the display section 68 to display the tire pressure corresponding to the mounted position of the tire according to the determination result from the central processing section 58. At the same time, the display control section 66 carries out control to cause the display section 68 to display also the determination result that the tire has blown out, for example.

The power supply section 70 controls electric power supplied from a battery mounted to the vehicle 12 to suitable voltages and supplies them to respective portions of the monitoring device 18.

The transmission device 16 and the monitoring device 18 are formed as described above.

The surface of the housing 22 of the transmission device 16 is provided with the protruding portion 44 (see FIG. 4) in which the opening portion 42 of the air vent 36 is formed as described above. The opening portion 42, the protruding portion 44, and the air vent 36 will be described below in detail.

The opening portion 42 connects the inner space 35 in the housing 22 and the tire cavity area in cooperation with the air vent 36. The opening portion 42 is formed on the top portion of the protruding portion 44 protruding in one direction from the surface of the housing 22.

The protruding portion 44 protrudes from the surface of the housing 22 and an area of the opening portion 42 is not larger than 0.4 mm$^2$. Furthermore, a contact plane in contact with the top portion of the protruding portion 44 and perpendicular to the protruding direction of the protruding portion 44 exists (can be assumed) and an area of a contact portion between the contact plane and the top portion is not larger than 30% of the area of the opening portion. Protruding height of the protruding portion 44 is 1 mm or greater. Height of any of the protruding portions 44 in the embodiments described hereafter is 1 mm or greater.

Moreover, in a section profile of the protruding portion 44 taken along a plane parallel to the protruding direction of the protruding portion 44 (a vertical direction in FIG. 4) and passing through a center of the opening portion 42, an inclination angle q of a line segment with respect to the surface of the housing 22 is preferably not smaller than 30 degree and smaller than 90 degree, in which the line segment is formed by connecting a position of a base portion and a position of the top portion (a position of the outmost point from the center of the opening portion 42) of the protruding portion 44 with an assumed straight line. The most preferably, the inclination angle q is 45 degree or larger. The reason why the inclination angle q is smaller than 90 degree is that, if the inclination angle q is 90 degree or larger, the area of the top portion of the protruding portion 44 becomes large with respect to the opening area, which increases a possibility that the puncture repair agent adheres to the top portion to close the opening portion 42 and the air vent 36.

Figure 7A:
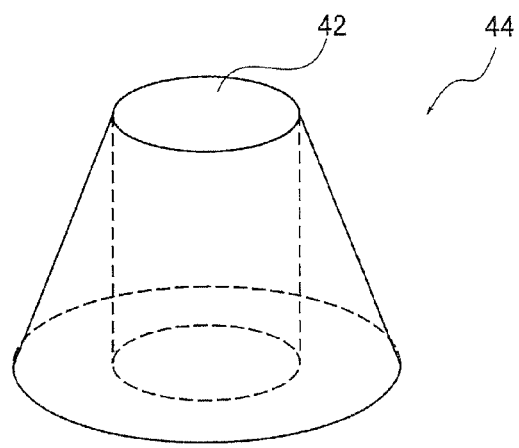
FIGS. 7A and 7B are drawings for explaining an example of shape of a protruding portion.
Figure 7B:
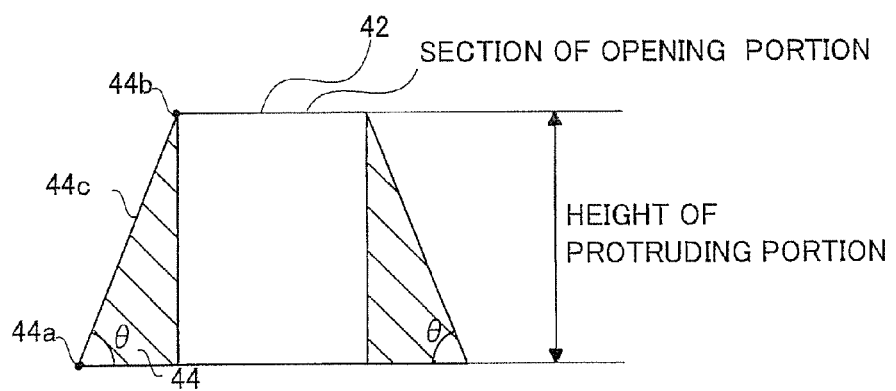

FIG. 7A is a perspective view of the protruding portion 44 illustrated in FIG. 4. FIG. 7B is a sectional view of the protruding portion 44 taken along a plane passing through the center of the opening portion 42.

The protruding portion 44, as understood from the section profile in FIG. 7B, is a frust-conical shape having an inclined face inclined at a constant angle. In this section profile, an assumed straight line 44c connecting a base portion position 44a and a top portion outmost position 44b of the protruding portion 44 coincides with the straight line of the inclined face of the protruding portion 44 and inclined at the constant angle in the section profile. The inclination angle q of the straight line 44c with respect to the surface of the housing 22 is not smaller than 30 degree and smaller than 90 degree. The opening portion 42 is connected to the air vent 36 passing through a wall of the housing 22.

The protruding portion 44 is formed on the surface of the housing 22 and the opening portion 42 is formed on the top portion of the protruding portion 44 as described above in order to avoid adhesion of the liquid puncture repair agent, which is injected into the tire cavity area for puncture repair at the time of the blowout of the tire, to a periphery of the opening portion 42 formed in the housing 22. Moreover, if the puncture repair agent spatters and adheres to the opening portion 42, surface tension prevents the puncture repair agent from entering the air vent 36 from the opening portion 42.

About a few hundred ml of puncture repair agent is injected into the tire cavity area at the time of the puncture repair. After the puncture repair agent is injected into the tire cavity area, the puncture repair agent that has entered a puncture position having a hole is solidified while the tire is rotated to thereby fill the puncture hole. However, the surplus liquid puncture repair agent spatters in the tire cavity area and adheres to the inner surface of the tire and the surface of the transmission device due to the rotation of the tire. At this time, the air vent 36 formed in the housing 22 may be closed. Therefore, in the embodiment, the opening portion 42 connected to the air vent 36 is formed on the top portion of the protruding portion 44 to thereby make the puncture repair agent more unlikely to adhere to the periphery of the opening portion 42 and, as a result, it is possible to prevent the puncture repair agent from closing the air vent 36.

Moreover, since the opening area of the opening portion 42 is 0.4 mm$^2$ or smaller, it is possible to prevent the puncture repair agent from entering the air vent 36 from the opening portion 42 even if the puncture repair agent adheres to the periphery of the opening portion 42.

An upper limit of the height of the protruding portion 44 is preferably 5 mm. If the protruding height is greater than the limit, it is highly possible that the protruding portion 44 becomes an obstacle in mounting of the tire valve and attachment of the tire to the rim or detachment of the tire from the rim. Because the opening portion 42 faces outward in the radial direction of the tire, the puncture repair agent spatters outward in the radial direction of the tire due to centrifugal force caused by rotation of the tire 14. Therefore, it is highly unlikely that the puncture repair agent enters the air vent 36 from the opening portion 42.

In the examples illustrated in FIGS. 7A and 7B, the top portion of the protruding portion 44 is an outer periphery line corresponding to an edge of the opening portion 42. Therefore, it is highly unlikely that the puncture repair agent adheres to the top portion other than the opening portion and there is little chance that the puncture repair agent closes the opening portion 42 and the air vent 36.

Furthermore, the inclined face between the base portion position 44a and the top portion outmost position 44b of the protruding portion 44 is preferably a water repellent face. As material of the water repellent face, silicon-based resin, fluorine-based resin, a modified resin obtained by grafting an organosilyl group or a fluoroalkyl group, or the like is used. Alternatively, the inclined face may be provided with microscopic asperities that exert water repellency. By making the inclined face water repellent, the puncture repair agent becomes less likely to adhere to the inclined face and it is possible to decrease the likelihood of the blockage of the opening portion 42 and the air vent 36.

It is preferable that an inner peripheral face of the opening portion 42 and an inner peripheral face of the air vent 36 connected to the opening portion 42 be made water repellant as well.

Figure 8A:
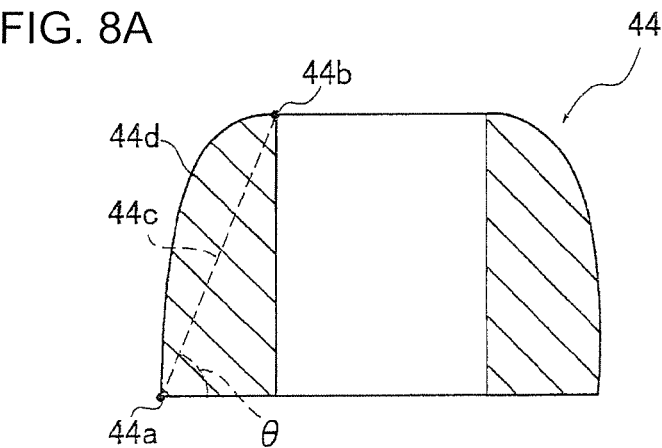
FIGS. 8A to 8C are drawings for explaining other examples of the shape of the protruding portion.
Figure 8B:
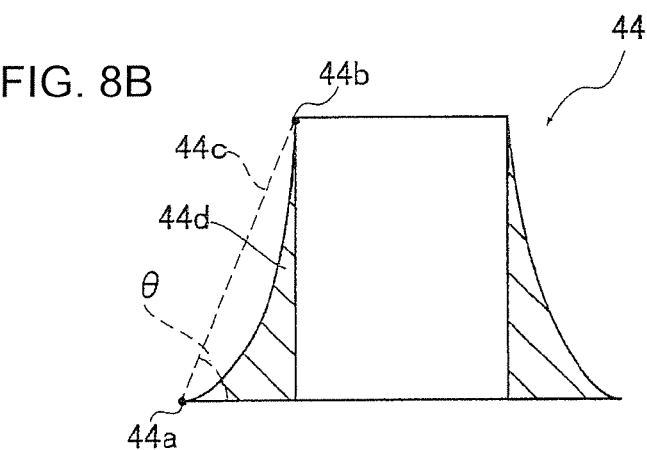
Figure 8C:
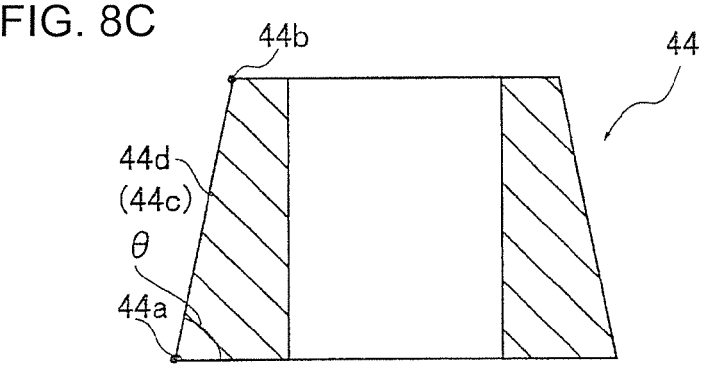

The protruding portion 44 may have one of shapes having section profile illustrated in FIGS. 8A to 8C besides the frust-conical shape.

As illustrated in FIGS. 8A and 8B, the inclined face connecting the base portion position 44a and the top portion outmost position 44b of the protruding portion 44 may be a curved face. In the example in FIG. 8A, a curved line 44d of the inclined face connecting the base portion position 44a and the top portion outmost position 44b bulges in the protruding direction of the protruding portion 44 in the section profile. In the example in FIG. 8B, a curved line 44d of the inclined face connecting the base portion position 44a and the top portion outmost position 44b is recessed in the protruding direction of the protruding portion 44 in the section profile. In such examples, the opening area of the opening portion 42 formed on the top portion of the protruding portion 44 is 0.4 mm² or smaller. When a contact plane in contact with the top portion of the protruding portion 44 and perpendicular to the protruding direction of the protruding portion 44 exists, an area of a contact portion between the contact plane and the top portion is not larger than 30% of the area of the opening portion. The opening portion 42 is connected to the air vent 36 passing through the housing 22.

In the section profile of the protruding portion 44, the inclination angle q of the imaginary straight line 44c (a dotted line in FIGS. 8A and 8B) connecting the base portion position 44a and the top portion outmost position 44b of the protruding portion 44 with respect to the surface of the housing 22 is not smaller than 30 degree and smaller than 90 degree. The most preferably, the inclination angle q is 45 degree or larger.

If the base portion position 44a or the top portion outmost position 44b are uncertain as in the examples illustrated in FIGS. 8A and 8B, for example, a position of the inclined face which is a hundredth (height from the face of the housing 22) the protruding height of the protruding portion 44 may be defined as the base portion position 44a and a position of the inclined face which is ninety-nine hundredths (height from the face of the housing 22) the protruding height of the protruding portion 44 may be defined as the top portion outmost position 44b.

In this case, the top portion is an area of the protruding portion 44 which is ninety-nine hundredths the protruding height of the protruding portion 44 and greater.

The example illustrated in FIG. 8C has a shape having a partially flat face at a top portion of the protruding portion 44 in a frust-conical shape. Protruding height of the protruding portion 44 (height from a base portion position 44a to a top portion outpost position 44b) is similar to the protruding portions 44 illustrated in FIGS. 8A and 8B and an opening area of the opening portion 42 formed on the top portion of the protruding portion 44 is 0.4 mm² or smaller. When a contact plane in contact with the top portion of the protruding portion 44 and perpendicular to the protruding direction of the protruding portion 44 exists, an area of a contact portion between the contact plane and the top portion is not larger than 30% of the area of the opening portion. At this time, if the contact portion between the contact plane and the top portion is uncertain, the contact portion is an area of each of sections of the protruding portion 44 at certain heights which are ninety-nine hundredths to hundred hundredths the protruding height. When a contact plane in contact with the area of each of the sections and perpendicular to the protruding direction of the protruding portion 44 exists, an area of a contact portion between the contact plane and the area of each of the sections is not larger than 30% of the area of the opening portion in the area of each of the sections. In this case, an inclination angle q of an imaginary straight line 44c (which coincides with a straight line 44d of the inclined face) connecting the base portion position 44a and the top portion outmost position 44b (the position of the point which is the farthest out from the center of the protruding portion 44) of the protruding portion 44 with respect to the surface of the housing 22 is preferably not smaller than 30 degree and smaller than 90 degree in the sectional shape. The most preferably, the inclination angle q is not smaller than 45 degree. The opening portion 42 is connected to the air vent 36 passing through the housing 22.

In each of the examples illustrated in FIGS. 8A to 8C, the opening portion 42 of the protruding portion 44 preferably faces outward in the radial direction of the tire.

Furthermore, the inclined face between the base portion position 44a and the top portion outmost position 44b of the protruding portion 44 is preferably a water repellent face. Moreover, the face of the top portion is preferably a water repellent face as well. Furthermore, the shape of the protruding portion 44 may be a frust-pyramidal shape besides the frust-conical shape.

Figure 9A:
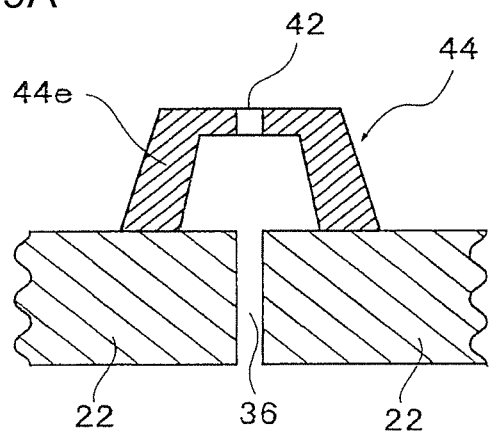
FIGS. 9A to 9C are drawings for explaining yet other examples of the shape of the protruding portion.
Figure 9B:
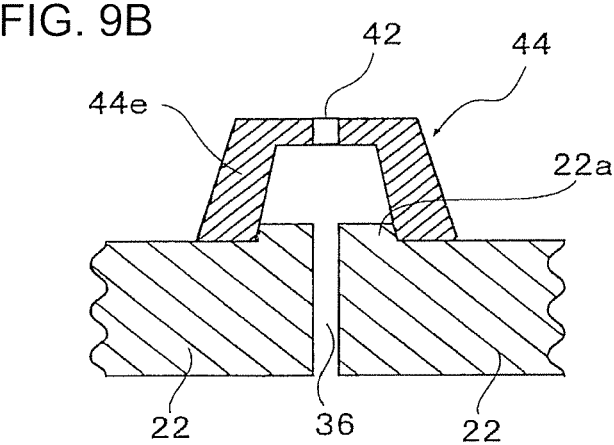
Figure 9C:
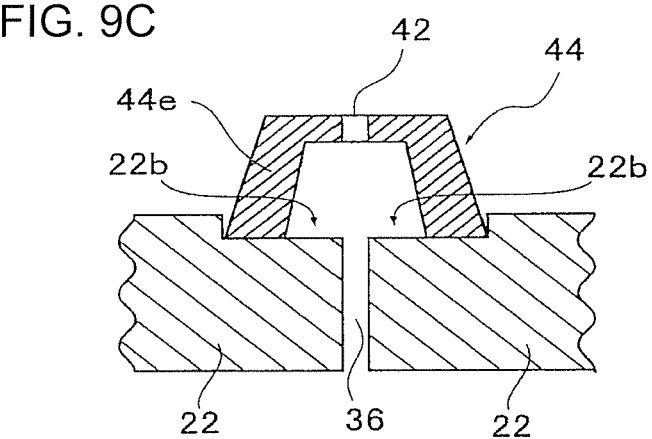

As illustrated in FIGS. 9A to 9C, a protruding member 44e fixed to the housing 22 may be provided as the protruding portion 44. The protruding member 44e is an outer shell member which is formed in a frust-conical shape or in a frust-pyramidal shape and does not have a bottom face. In this case, the opening portion 42 is formed on a top portion of the protruding member 44e.

Such a protruding member 44e may be joined to a surface of the housing 22 by an adhesive or the like as illustrated in FIG. 9A. As illustrated in FIG. 9B, the protruding member 44e may be fixed to the housing 22 by fitting an inner face of the protruding member 44e over a convex portion 22a provided to a surface of the housing 22. As illustrated in FIG. 9C, the protruding member 44e may be fixed to the housing 22 by fitting an outer face of the protruding member 44e in a recessed portion 22b formed in a surface of the housing 22.

In each of the examples illustrated in FIGS. 9A to 9C, an opening area of an opening portion 42 formed on the top portion of the protruding portion 44 is 0.4 mm² or smaller. When a contact plane in contact with the top portion of the protruding portion 44 and perpendicular to the protruding direction of the protruding portion 44 exists, an area of a contact portion between the contact plane and the top portion is not larger than 30% of the area of the opening portion. The opening portion 42 of the protruding portion 44 preferably faces outward in the radial direction of the tire. In a section profile of the protruding portion 44 taken along a plane parallel to the protruding direction of the protruding portion 44 and passing through a center of the opening portion 42, an inclination angle of a line segment with respect to a surface of the housing 22 is preferably not smaller than 30 degree and smaller than 90 degree, in which the line segment is obtained by connecting a position of a base portion and a position of the top portion 42 which is the farthest out from the center of the protruding portion 44 with an assumed straight line. Most preferably, the inclination angle is not smaller than 45 degree. Furthermore, the inclined face between the base portion position 44a and the top portion outmost position 44b of the protruding member 44e is preferably a water repellent face. Moreover, the face of the top portion is preferably a water repellent face as well.

In this case, it is possible to increase a sectional area of the air vent 36 passing through the housing 22.

The protruding portion 44 may be made up of a replaceable locked member 37 as illustrated in FIGS. 10A to 10E.

As illustrated in FIGS. 10A to 10E, the locked member 37 is provided with the protruding portion 44 having an opening portion of an air vent 36 positioned in a top portion of the locked member 37 when the locked member 37 is mounted to the housing 22. Because the opening portion of the air vent 36 is formed on the top portion of the locked member 37, the puncture repair agent that has adhered to the top portion of the protruding portion 44 having the opening portion is likely to slip off an inclined face and less likely to remain on the top portion. Especially, the inclined face of the protruding portion 44 surrounding the opening portion is preferably a water repellent face. As material of the water repellent face, a silicon-based resin, a fluorine-based resin, a modified resin obtained by grafting an organosilyl group or a fluoroalkyl group, or the like is used, for example. Alternatively, the inclined face may be provided with microscopic asperities that exert water repellency. By making the inclined face water repellent, the puncture repair agent becomes less likely to adhere to the inclined face. Therefore, it is possible to decrease the likelihood of the blockage of the air vent 36 with the puncture repair agent.

Figure 10A:
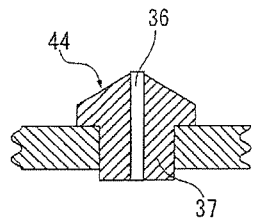
FIGS. 10A to 10E are drawings for explaining other forms of the protruding portion in the first embodiment.
Figure 10B:
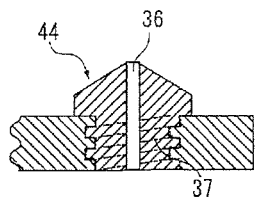
Figure 10C:
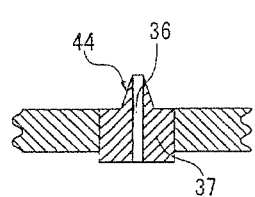
Figure 10D:
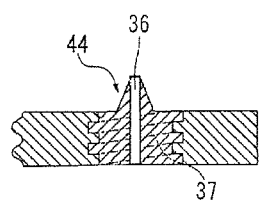
Figure 10E:
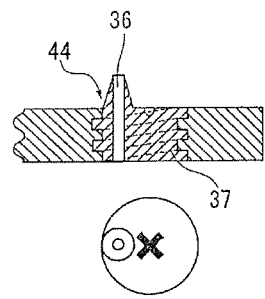

As in each of the examples illustrated in FIGS. 10A and 10C, the locked member 37 may be mounted to the housing 22 by locking the member 37 to a side face of an opening hole formed in the housing 22 by friction or may be mounted by fitting or press fitting. Alternatively, as illustrated in FIGS. 10B, 10D, and 10E, the locked member 37 may be mounted to the housing 22 by screwing.

An area of the opening portion in the protruding portion 44 made up of such a locked member 37 is 0.4 mm$^2$ or smaller. An area of a contact portion between the top portion and a contact plane in contact with the top portion of the protruding portion and perpendicular to the protruding direction of the protruding portion is not larger than 30% of the area of the opening portion.

Moreover, in a section profile of the protruding portion taken along a plane parallel to the protruding direction of the protruding portion and passing through a center of the opening portion, an inclination angle of a line segment with respect to a surface of the housing 22 is preferably not smaller than 30 degree and smaller than 90 degree, in which the line segment is obtained by connecting a position of a base portion and a position of the top portion which is the farthest out from the center of the protruding portion with an assumed straight line. Most preferably, the inclination angle is not smaller than 45 degree. Moreover, an inclination angle of the inclined face between the base portion and the top portion of the protruding portion 44 in the section profile is preferably constant. The opening portion of the locked member 37 preferably faces outward in the radial direction of the tire. Such preferable forms are similarly preferable in the second to fourth embodiments described below.

Figure 11:
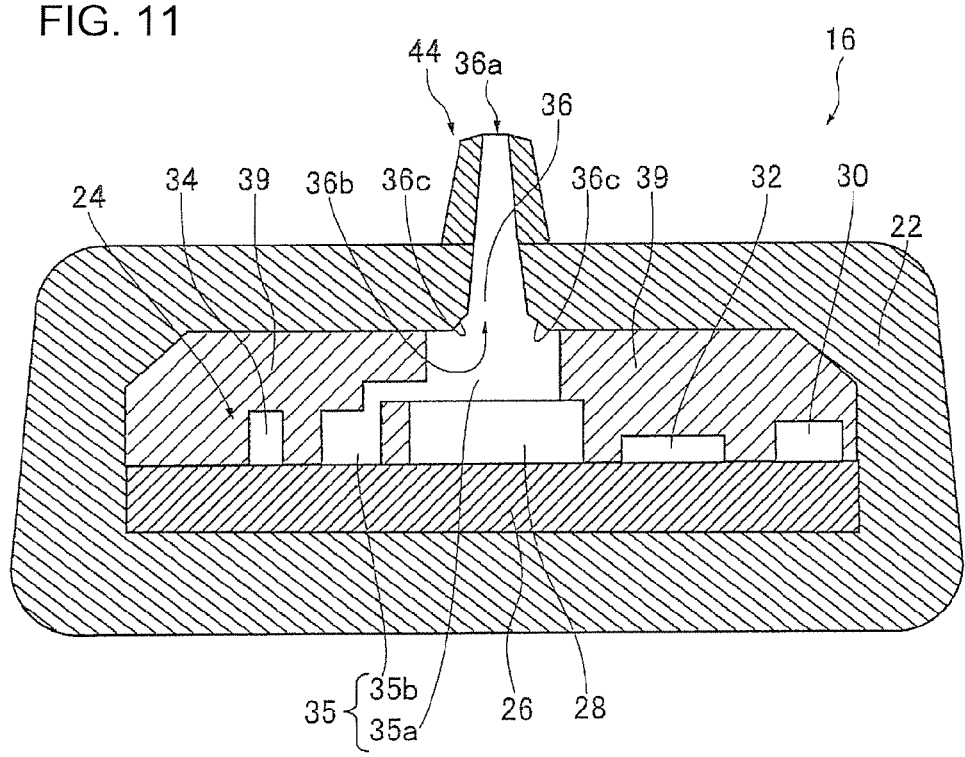
FIG. 11 is a sectional view of a second embodiment of the transmission device used for the tire pressure monitoring system.

FIG. 11 is a sectional view of a second embodiment of the transmission device 16. A circuit configuration of a monitoring device used together with the transmission device 16 of the second embodiment is similar to that of the monitoring device 18 of the first embodiment.

The transmission device 16 illustrated in FIG. 11 includes the housing 22 and the circuit 24 provided in the housing 22 similarly to the transmission device 16 illustrated in FIG. 4. The circuit 24 includes a substrate 26, and a sensor unit 28, a transmitter 30, a processing unit 32, a power supply section 34, and an antenna (not illustrated) provided to the substrate 26. In the housing 22, an inner space 35 is formed and the inner space 35 has a sensor space 35a and a reservoir space 35b for collecting and storing the liquid such as the puncture repair agent that has entered the inner space 35. The housing 22 is provided with an air vent 36 connecting the inner space 35 in the housing 22 and a tire cavity area and passing through the housing 22. A protruding portion 44 protruding toward the tire cavity area is provided to a surface of the housing 22. An outer opening portion 36a of the air vent 36 is formed on a top portion of the protruding portion 44. On the other hand, an inner opening portion 36b of the air vent 36 is formed in an inner surface of the housing 22 where the air vent 36 faces the inner space 35 (the sensor space 35a).

The sensor space 35a is formed between the air vent 36 and a sensor unit 28 and a sensor face of the sensor unit 28 faces the sensor space 35a.

In the second embodiment, similarly to the first embodiment, an opening area of the outer opening portion 36a of the air vent 36 is 0.4 mm$^2$ or smaller. Furthermore, an area of a contact portion between a contact plane in contact with the top portion of the protruding portion 44 and the top portion is not larger than 30% of the area of the outer opening portion 36a.

Because the area of the contact portion between the contact plane in contact with the top portion of the protruding portion 44 and the top portion is not larger than 30% of the area of the outer opening portion 36a, the liquid such as the tire puncture repair agent becomes less likely to adhere to a periphery of the outer opening portion 36a. Because the opening area of the outer opening portion 36a is 0.4 mm$^2$ or smaller, the liquid such as the tire puncture repair agent becomes less likely to enter the air vent 36. Height of the protruding portion 44 is 1 mm or greater. The height of the protruding portion 44 is preferably 5 mm or less.

Moreover, the inner opening portion 36b of the air vent 36 has a larger opening area than the outer opening portion 36a.

In an inner area surrounded with a wall of the housing 22, sealing resin 39 is filled as an inner member while remaining the inner space 35. In other words, the inner space 35 is formed by inner wall faces of the housing 22 and inner walls of the inner member provided to the housing 22. Therefore, the inner space 35 is smaller than the inner area surrounded with the wall of the housing 22. Moreover, as illustrated in FIG. 11, a section of the sensor space 35a increases from a section of the inner opening portion 36b of the air vent 36.

In the housing 22, the air vent 36 is provided as an only passage connecting the tire cavity area and the inner space 35. This is because, it is extremely easy for the liquid such as the puncture repair agent to enter the air vents 36 if there are a plurality of air vents 36. By providing the air vent 36 as the only passage connecting the tire cavity area and the inner space 35, the liquid such as the puncture repair agent becomes less likely to enter the inner space 35 against pressure in the closed inner space 35 when the liquid such as the puncture repair agent closes the outer opening portion 36a. Although at least one of the wall faces of the inner space 35 is formed by the sealing resin 39, the inner member is not limited to the sealing resin 39. As the inner member, a resin material formed into a predetermined shape may be disposed.

As described above, a sectional area of the air vent 36 connecting the inner space 35 of the housing 22 of the transmission device 16 and the tire cavity area continuously increases as it goes from the outer opening portion 36a toward the inner opening portion 36b.

The outer opening portion 36a of the air vent 36 is formed on the top portion of the protruding portion 44 protruding by 1 mm or longer from the surface of the housing 22 toward the tire cavity area. By forming the outer opening portion 36a on the top portion of the protruding portion 44, it is possible to prevent the puncture repair agent from adhering to the outer opening portion 36a even if the puncture repair agent is introduced into the tire cavity area for puncture repair. Especially because the protruding portion 44 is provided to the housing 22 to protrude outward in a radial direction of a tire, it is possible to cast off the puncture repair agent, that has adhered to the protruding portion 44, outward in the radial direction of the tire due to centrifugal force caused by rolling of the tire. As a result, it is possible to effectively prevent adhesion of the puncture repair agent to the outer opening portion 36a.

Moreover, by changing the section of the air vent 36 instead of making it uniform, surface tension in a vicinity of the inner opening portion 36b is smaller than that in a vicinity of the outer opening portion 36a and a capillary phenomenon becomes less likely to occur, which makes it difficult for the puncture repair agent to enter the air vent 36. If the puncture repair agent enters the air vent 36, the opening area of the inner opening portion 36b is larger than that of the outer opening portion 36a and therefore, the puncture repair agent does not stay in the air vent 36 but swiftly moves into the inner space 35.

The opening area of the inner opening portion 36b is preferably four times the opening area of the outer opening portion 36a or larger in order to prevent the puncture repair agent from entering the air vent 36 and from closing the air vent 36.

The inner opening portion 36b of the air vent 36 is provided with a chamfer 36c to prevent the puncture repair agent from staying and it is allowed to swiftly flow out of the air vent 36. Instead of the chamfer 36c, the edge of the inner opening portion 36b may be rounded with a curvature.

Figure 12:
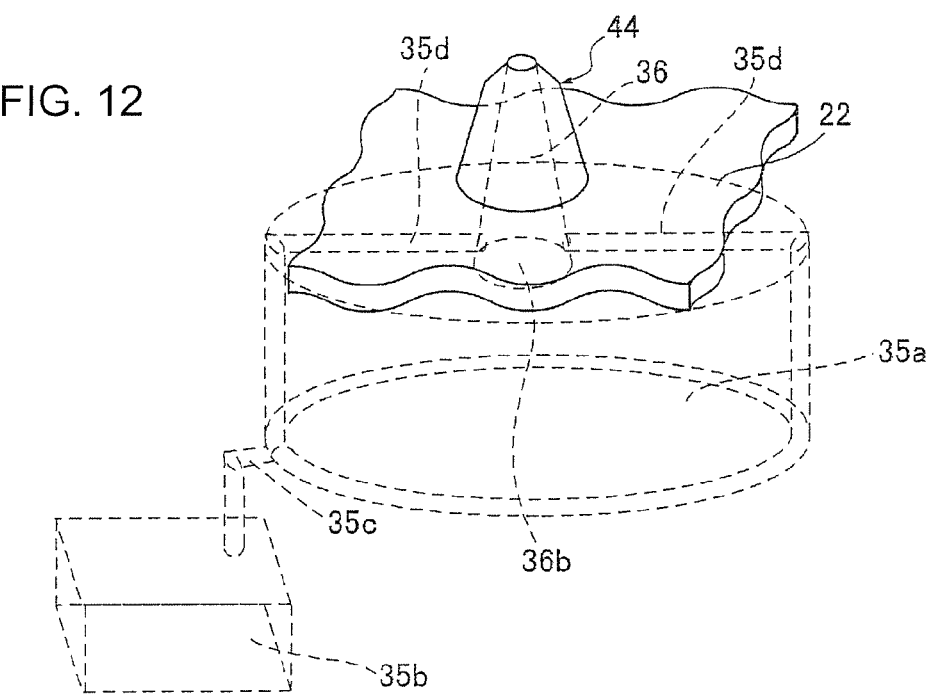
FIG. 12 is a drawing for explaining an inner space in the transmission device illustrated in FIG. 11.

FIG. 12 is a drawing for explaining the inner space 35 in the transmission device 16 illustrated in FIG. 11.

In the inner space 35, the sensor space 35a which the sensor face of the sensor unit 28 faces is formed between the air vent 36 and the sensor unit 28 and is formed by inner walls of the sealing resin 39 provided in the housing 22 as well as the inner walls of the housing 22. The sensor space 35a is smaller than the inner area surrounded with the inner walls of the housing 22 and the sectional area of the sensor space 35a increases from that of the inner opening portion 36b of the air vent 36.

The reservoir space 35b is provided separately from the sensor space 35a and connected to the sensor space 35a through a connecting pipe 35c.

The sensor space 35a is in a cylindrical shape and grooves 35d extending from the inner opening portion 36b are formed in a wall face (ceiling face) of the sensor space 35a provided with the inner opening portion 36b. The inner opening portion 36b illustrated in FIG. 12 is formed substantially at a center of the circular wall face (ceiling face) and two grooves 35d extend in different directions from the inner opening portion 36b. In a side face of the cylindrical sensor space 35a in the drawing, the two grooves 35d extend to a wall face which is a bottom face in the drawing. The grooves 35d extending from the side face extend to an edge of the circular wall face which is the bottom face in the drawing and the two grooves 35d extend along the edge of the bottom face and are connected to the connecting pipe 35c. Therefore, the liquid such as the puncture repair agent that has entered the sensor space 35a from the inner opening portion 36b is guided by the grooves 35d, flows into the connecting pipe 35c, and is stored in the reservoir space 35b. In other words, the grooves 35d serve as guide grooves for the puncture repair agent.

Because the sectional area of the air vent 36 increases from the outer opening portion 36a toward the inner opening portion 36b as described above, the capillary phenomenon is less likely to occur and the liquid such as the puncture repair agent is less likely to enter the air vent 36 from the outer opening portion 36a as compared with a prior-art case in which the sectional area of the air vent is uniform. Even if the liquid such as the puncture repair agent enters the inner space 35, it does not stay in the air vent 36 but flows into the inner space 35 (sensor space 35a) and eventually flows into the reservoir space 35b along the grooves 35d. As a result, it is possible to prevent the liquid such as the puncture repair agent from wetting the sensor face and inhibiting operation of the sensor in the sensor space 35a.

Although the two grooves 35d extend from the inner opening portion 36b in the example illustrated in FIG. 12, the number of the grooves 35d may be one, three, or more. However, it is preferable to provide three or more grooves 35d in order to efficiently allow the liquid such as the puncture repair agent to flow into the reservoir space 35b.

Figure 13A:
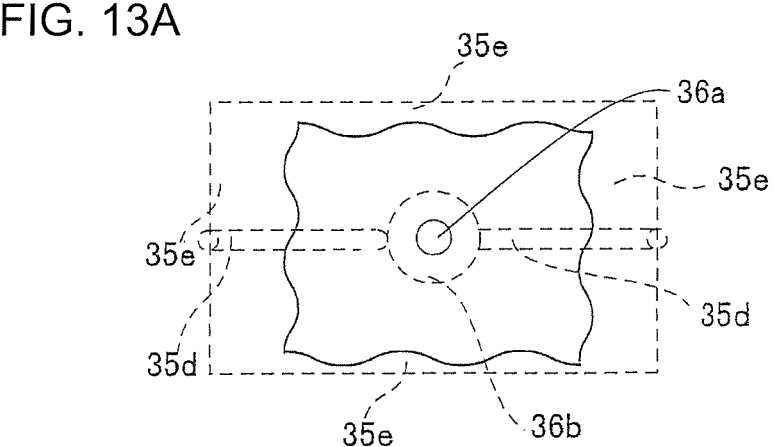
FIGS. 13A and 13B are drawings for explaining an example of a reservoir space different from a reservoir space illustrated in FIG. 12.
Figure 13B:
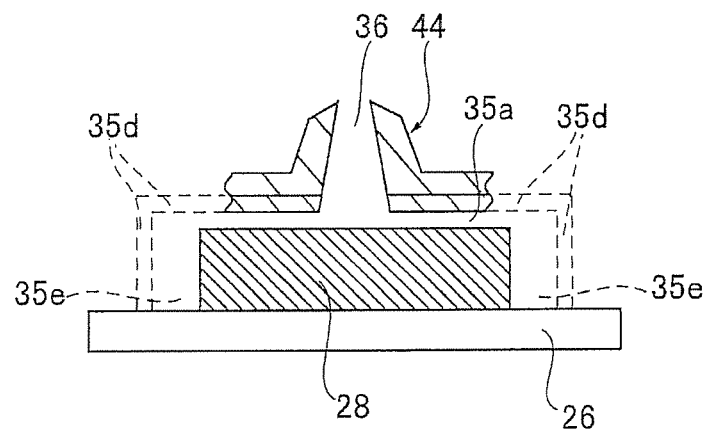

FIGS. 13A and 13B are drawings for explaining a modification of a reservoir space 35e different from the reservoir space 35b illustrated in FIG. 12. FIG. 13A is a top view and FIG. 13B is a side view.

The inner space 35 includes the sensor space 35a and the reservoir space 35e. The reservoir space 35e is provided closer to the substrate 26 than the sensor space 35a. The sensor space 35a is provided between the air vent 36 and the sensor unit 28. The reservoir space 35e is provided to surround the sensor unit 28. In a wall face of the sensor space 35a provided with the inner opening portion 36b, the grooves 35d extending from the inner opening portion 36b toward the reservoir space 35e are formed.

Therefore, in the examples illustrated in FIGS. 13A and 13B, similarly to the example illustrated in FIG. 12, even if the liquid such as the puncture repair agent adheres to the outer opening portion 36a, the sectional area of the air vent 36 increases from the outer opening portion 36a toward the inner opening portion 36b and therefore the liquid such as the puncture repair agent is less likely to enter as compared with the prior art in which the sectional area of the air vent is uniform. Even if the liquid such as the puncture repair agent enters the inner space 35, it does not stay in the air vent 36 but flows into the inner space 35 and eventually flows into the reservoir space 35e along the grooves 35d. As a result, it is possible to prevent the liquid such as the puncture repair agent from wetting the sensor face and inhibiting operation of the sensor in the sensor space 35a.

Figure 14:
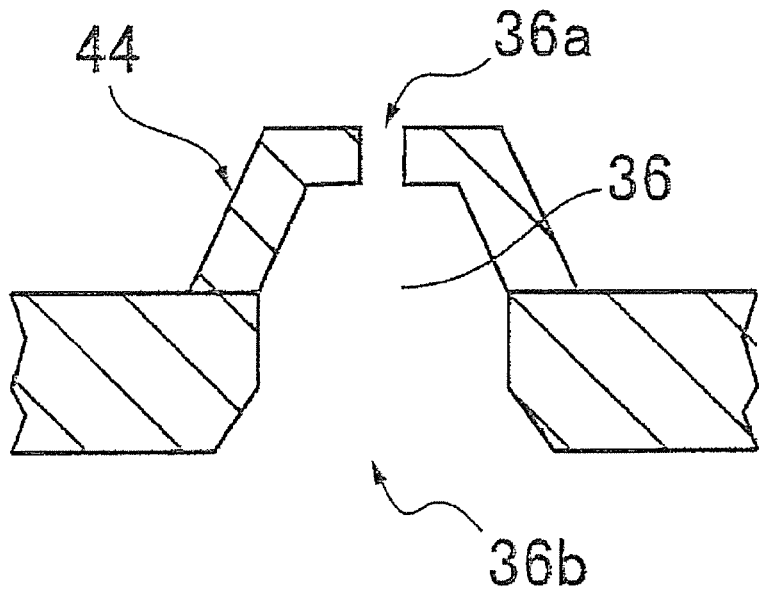
FIG. 14 is a drawing for explaining yet another example of an air vent of the transmission device illustrated in FIG. 11.

FIG. 14 is a drawing for explaining yet another modification of the air vent 36 of the transmission device 16 illustrated in FIG. 11. The air vent 36 illustrated in FIG. 14 is different from the air vent 36 illustrated in FIG. 11 in that its sectional area increases in a stepwise fashion from the outer opening portion 36a toward the inner opening portion 36b. The edge of the inner opening portion 36b of the air vent 36 is chamfered.

In such an air vent 36, even if the liquid such as the puncture repair agent adheres to the outer opening portion 36a, the sectional area of the air vent 36 increases in the stepwise fashion from the outer opening portion 36a toward the inner opening portion 36b and therefore the capillary phenomenon is less likely to occur and the liquid such as the puncture repair agent is less likely to enter the air vent 36 and the inner space 35 as compared with the prior-art case in which the sectional area of the air vent is uniform.

Figure 15:
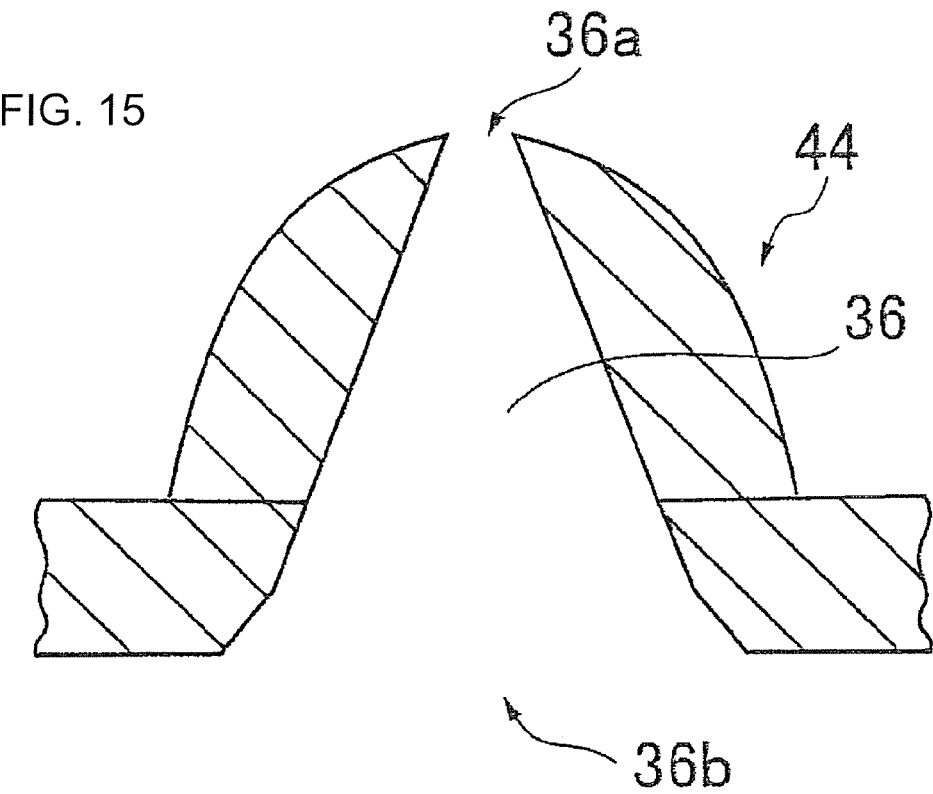
FIG. 15 is a drawing for explaining another example of a protruding portion of the transmission device illustrated in FIG. 11.

FIG. 15 is a drawing for explaining another modification of the protruding portion 44 of the transmission device 16 illustrated in FIG. 11. In the case of the protruding portion 44 illustrated in FIG. 11, when the protruding portion 44 is cut along a plane including a central axis of the air vent 36, the inclined face of the protruding portion 44 facing the tire cavity area is provided with a bent portion, where the inclination angle reduces, on its way to the top portion of the protruding portion 44. As a result, the inclined face has the bulged shape toward the tire cavity area.

On the other hand, in the modification illustrated in FIG. 15, the inclined face of the protruding portion 44 is formed in a curved shape to form a bulge portion toward the tire cavity area.

By forming the inclined face of the protruding portion 44 in the bulge shape toward the tire cavity area in this manner, it is possible to efficiently provide the air vent 36 having the sectional shape increasing from the outer opening portion 36a toward the inner opening portion 36b. If the inclined face of the protruding portion 44 is in a recessed shape toward the tire cavity area, the wall can be thin in a thickness between the inclined face and an inner surface of the air vent having the sectional area increasing from the outer opening portion toward the inner opening portion. Then the protruding portion 44 may be deformed under small external force (e.g., force received at the time of attachment or detachment of the tire to or from the rim). Therefore, it is preferable to form the inclined face of the protruding portion 44 into the protruding shape toward the tire cavity area.

In the protruding portion 44 illustrated in each of FIGS. 12 to 15, the opening area of the outer opening portion 36a of the air vent 36 is 0.4 mm$^2$ or smaller and the area of the contact portion between the contact plane in contact with the top portion of the protruding portion 44 and the top portion is not larger than 30% of the area of the outer opening portion 36a. The height of the protruding portion 44 is 1 mm to 5 mm.

Figure 16A:
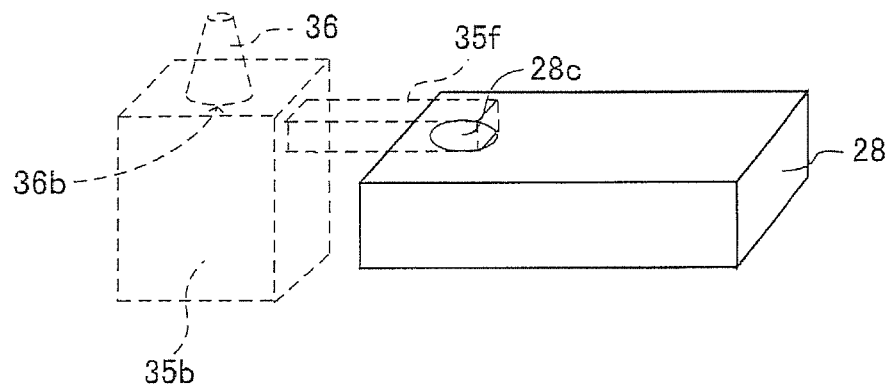
FIGS. 16A and 16B are drawings for explaining examples of an inner space different from the inner space illustrated in FIG. 11.
Figure 16B:
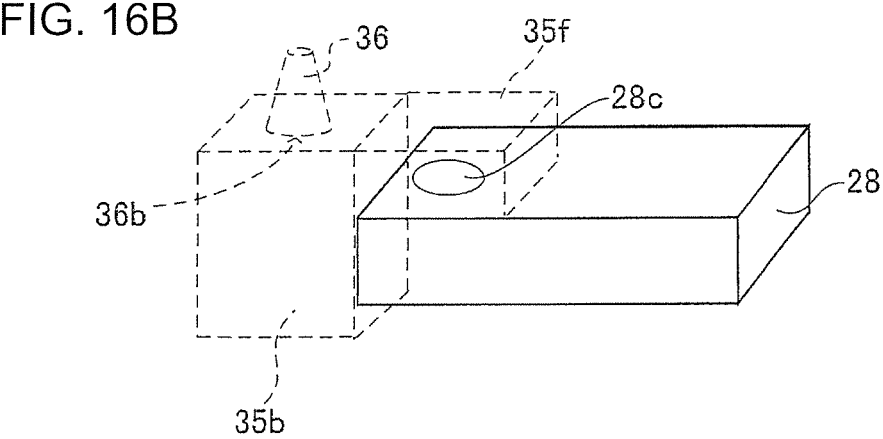

FIGS. 16A and 16B are drawings for explaining modifications of the inner space different from the inner space 35 illustrated in FIG. 11.

The housing 22 is provided with the reservoir space 35b for storing the liquid such as the puncture repair agent that has entered the inner space 35 through the air vent 36. The reservoir space 35b is provided to be adjacent to the air vent 36 and the inner opening portion 36b of the air vent 36 is formed in a wall face of the reservoir space 35b. Furthermore, a sensor space 35f branches off from the wall face of the reservoir space 35b. A sensor face 28c (e.g., a diaphragm) of the sensor unit 28 faces the sensor space 35f. The sensor space 35f may be a narrow branch space corresponding to a width of the sensor face 28c as illustrated in FIG. 16A or may be a branch space wide enough to surround the sensor face 28c as illustrated in FIG. 16B.

By disposing such a reservoir space 35b, the liquid such as the puncture repair agent does not reach the sensor space 35f but is stored in the reservoir space 35b and therefore it is possible to prevent the liquid such as the puncture repair agent from wetting the sensor face and inhibiting operation of the sensor.

A transmission device in a third embodiment is different from that in the first embodiment in a shape of the housing 22 around the protruding portion 44. Other structures of the tire pressure monitoring system in the third embodiment are similar to those in the first embodiment described above.

Figure 17:
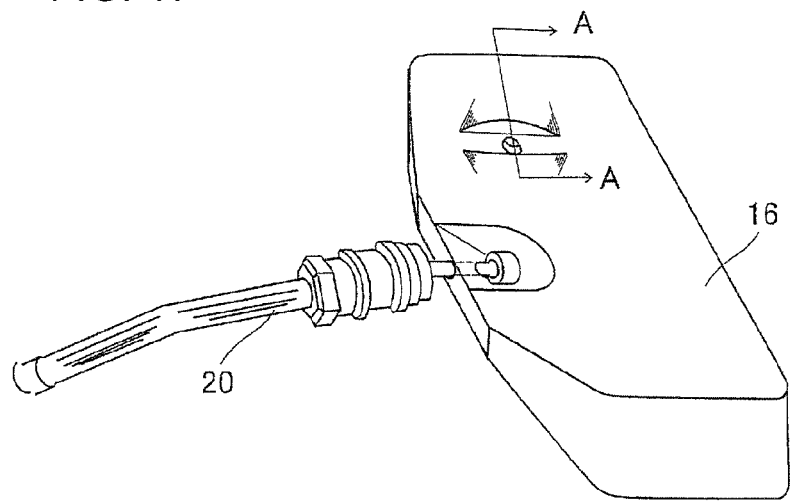
FIG. 17 is a general perspective view of a third embodiment of the transmission device.
Figure 18:
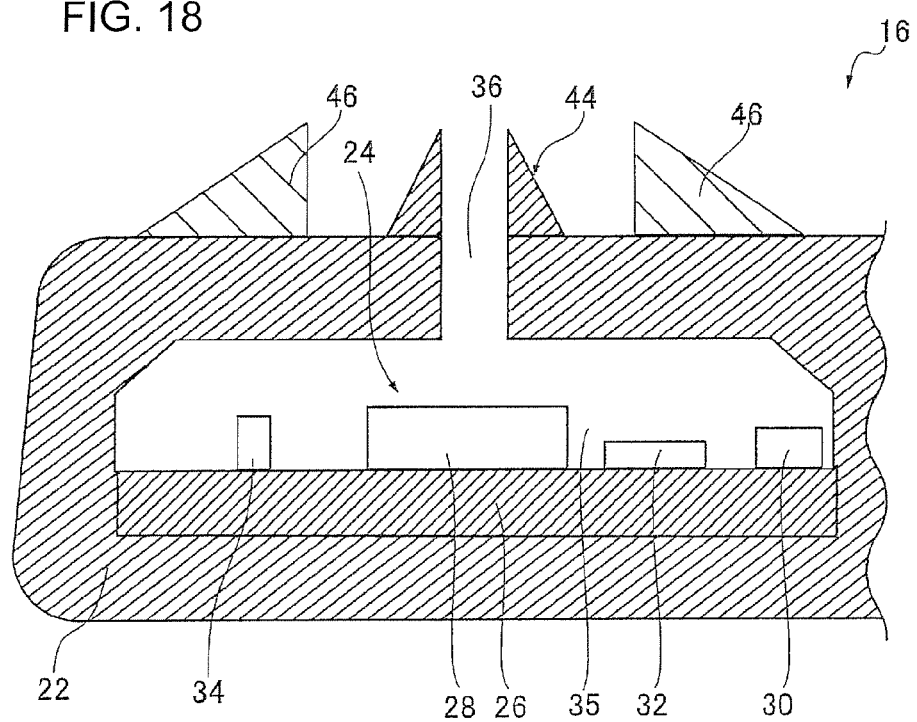
FIG. 18 is a drawing which illustrates a section of the transmission device illustrated in FIG. 17.

FIG. 17 is a general perspective view of the third embodiment of the transmission device 16. FIG. 18 is a drawing showing a section of the third embodiment of the transmission device 16. As illustrated in FIG. 18, the housing 22 is provided with the protruding portion 44 protruding outward in the radial direction of the tire (upward in a plane of paper of FIG. 18) from the surface of the housing 22. Here, the radial direction of the tire refers to a direction orthogonal to a rotation axis of a pneumatic tire and outward in the radial direction of the tire refers to a direction away from the rotation axis of the pneumatic tire in the radial direction of the tire. In the protruding portion 44, the air vent 36 spacially connecting the inner space 35 in the housing 22 and the tire cavity area is formed. Height of the protruding portion 44 from the surface of the housing 22 is 1 mm to 5 mm.

The housing 22 is provided with a protecting wall 46 having height from the surface of the housing 22 which is 70% to 130% of the height of the protruding portion 44. The protecting wall 46 protects the protruding portion 44 so that the protruding portion 44 is not damaged in the attachment and detachment of the tire to and from the rim.

Because the protruding portion 44 has a similar shape to the protruding portion 44 of the transmission device 16 in the first embodiment, the shape of the protruding portion 44 will not be described. In the third embodiment, similarly to the protruding portion 44 of the transmission device 16 in the first embodiment, the opening area of the outer opening portion of the air vent 36 is 0.4 mm$^2$ or smaller and the area of the contact portion between the contact plane in contact with the top portion of the protruding portion 44 and the top portion is not larger than 30% of the area of the outer opening portion.

Figure 19:
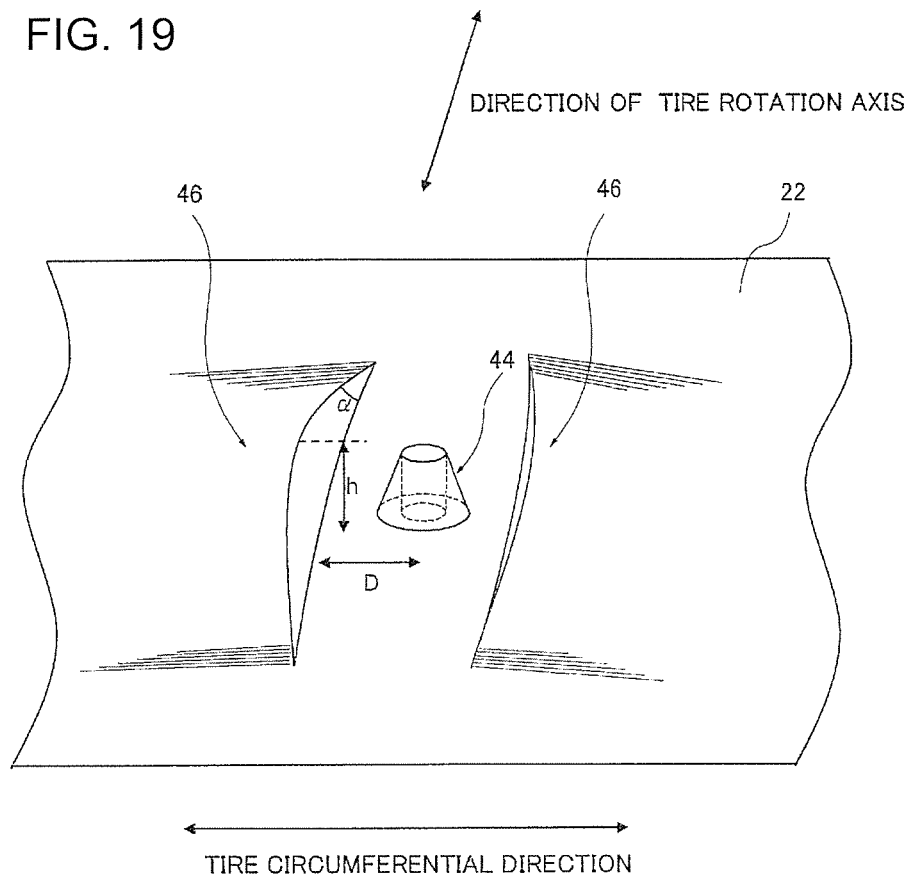
FIG. 19 is a perspective view illustrating a protruding portion and protecting walls provided to a housing of the transmission device illustrated in FIG. 17.

FIG. 19 is a perspective view showing the protruding portion 44 and the protecting wall 46 provided to the housing 22. A left-right direction of FIG. 19 is a circumferential direction of the tire. Here, the circumferential direction of the tire refers to a direction in which the pneumatic tire rotates about the rotation axis of the tire. A pair of protecting walls 46 protrudes from the same level of a face along the tire circumferential direction as the protruding portion 44 and extends in a direction of the tire rotation axis in such a manner as to sandwich the protruding portion 44. Height h of the protecting walls 46 from the surface of the housing 22 is 70% to 130% of height H of the protruding portion 44. If the height of the protecting wall 46 from the surface of the housing 22 is not uniform, the maximum height from the surface of the housing 22 is defined as the height h of the protecting wall 46.

By providing the protecting walls 46 which is 70% to 130% of the height H of the protruding portion 44 in the vicinity of the protruding portion 44, the protruding portion 44 can be protected from being damaged due to a hit of the protruding portion 44 by a bead portion of a tire when the tire is mounted to the rim.

Because the bead portion is an annular shape, the protruding portion 44 can be protected from being damaged due to a hit of the protruding portion 44 by a bead portion, if the height h of the protecting walls 46 is not lower than 70% of the height H of the protruding portion 44, even if the height h of the protecting walls 46 is lower than the height H of the protruding portion 44.

The maximum height positions of the protecting wall 46 illustrated in FIG. 19 are positioned in the tire circumferential direction with reference to the position of the protruding portion 44 when the transmission device 16 is provided in the tire cavity area. In other words, the maximum height positions of the protecting walls 46 are in the same position as the protruding portion 44 in the direction of the tire rotation axis. By providing the protecting walls 46 in the tire circumferential direction with reference to the position of the protruding portion 44, the bead portion passes over the protecting walls 46 in the attachment of the tire to the rim and therefore it is possible to protect protruding portion 44 from the damage by the bead portion.

In the example illustrated in FIG. 19, the height of the protecting walls 46 from the surface of the housing 22 continuously changes along the direction of the tire rotation axis when the transmission device 16 is provided in the tire cavity area.

To put it concretely, the protecting walls 46 rise from the surface of the housing 22 along the direction of the tire rotation axis and descend to the surface of the housing 22 after they pass through the maximum height positions. At this time, an angle a of a surface of the protecting wall 46 on a tire inner side (a side of a tire center line) in the direction of the tire rotation axis with respect to the surface of the housing 22 is 45 degree or smaller. By setting the angle a to 45 degree or smaller, the bead portion of the tire can smoothly passes over the protecting walls 46 when the tire is mounted to the rim and therefore the tire can be easily attached to the rim.

In the example illustrated in FIG. 19, a distance D between the protecting wall 46 and the protruding portion 44 is 4 mm to 20 mm. Here, the distance D between the protecting wall 46 and the protruding portion 44 is a distance in the tire circumference direction from a center of the protruding portion 44 to the protecting wall 46. By setting the distance D between the protecting wall 46 and the protruding portion 44 to 4 mm or longer, retention of the puncture repair agent between the protecting wall 46 and the protruding portion 44 can be prevented and entry of the puncture repair agent into the opening portion 42 of the protruding portion 44 can be prevented.

Furthermore, the surface of the housing 22 between the protecting wall 46 and the protruding portion 44 is preferably made water repellent. As material for the water repellent treatment, a silicon-based resin, a fluorine-based resin, a modified resin obtained by grafting an organosilyl group or a fluoroalkyl group, or the like is used. Alternatively, the surface of the housing 22 between the protecting wall 46 and the protruding portion 44 may be provided with microscopic asperities that exert water repellency. By making the surface of the housing 22 between the protecting wall 46 and the protruding portion 44 water repellent, the puncture repair agent becomes less likely to adhere to the surface of the housing 22 between the protecting wall 46 and the protruding portion 44 and then, the entry of the puncture repair agent into the opening portion 42 can be prevented.

Although the example in which the protecting walls 46 are provided on both sides of the protruding portion 44 is described in the example illustrated in FIG. 19, the protecting walls 46 do not necessarily have to be provided on both sides of the protruding portion 44. For example, if the protecting wall 46 is provided on only one side of the protruding portion 44, it is possible to prevent the damage to the protruding portion 44 by the bead portion.

Figure 20:
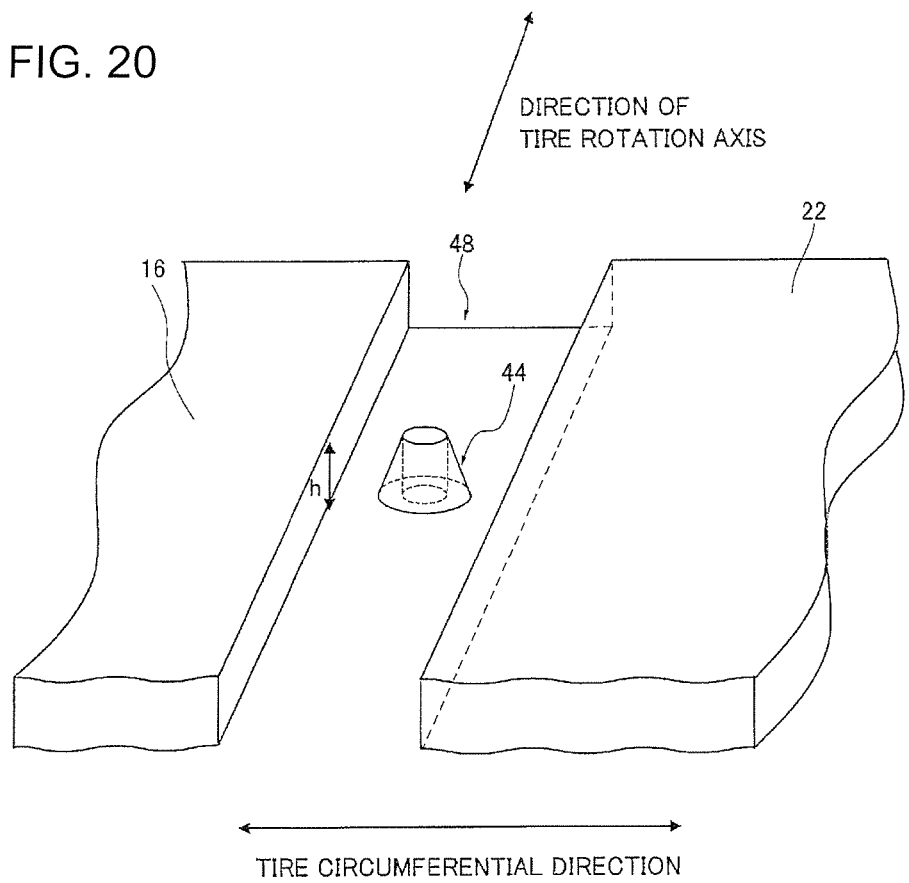
FIG. 20 is a perspective view illustrating an example of shape of a housing around a protruding portion in a fourth embodiment of the transmission device.

FIG. 20 is a perspective view showing an example of shape of the housing 22 around the protruding portion 44 in the fourth embodiment. The transmission device 16 of the fourth embodiment is different from that of the third embodiment in the shape of the housing 22 around the protruding portion 44. Other structures of the tire pressure monitoring system in the fourth embodiment are similar to those in the first embodiment described above.

As illustrated in FIG. 20, the housing 22 of the fourth embodiment is provided with a recessed portion 48 formed by partially recessing the housing 22 from the surface of the housing 22.

The recessed portion 48 is provided with the protruding portion 44. Height of the protruding portion 44 from a bottom of the recessed portion 48 is 1 mm to 5 mm. Details of the shape of the protruding portion 44 are similar to those of the first embodiment and will not be described. In the fourth embodiment, similarly to the protruding portion 44 of the transmission device 16 of the first embodiment, an opening area of the opening portion of the air vent 36 is 0.4 mm$^2$ or smaller and an area of a contact portion between the contact plane in contact with the top portion of the protruding portion 44 and the top portion is not larger than 30% of the area of the opening portion.

Depth h of the recessed portion 48 is 70% to 130% of the height of the protruding portion 44.

Because the recessed portion 48 is formed in the part of the housing 22 and the protruding portion 44 is formed in the recessed portion 48 in the transmission device 16 of the fourth embodiment, the protruding portion 44 can be protected from being damaged due to the hit of the protruding portion 44 by the bead portion when the tire is mounted to the rim.

Because the bead portion is the annular shape, the protruding portion 44 can be protected from being damaged due to the hit of the protruding portion 44 by the bead portion, if the depth h of the recessed portion 48 is not lower than 70% of the height H of the protruding portion 44, even if the depth h of the recessed portion 48 is smaller than the height H of the protruding portion 44.

As illustrated in FIG. 20, when the transmission device 16 is provided in the tire cavity area, the transmission device 16 is preferably disposed so that the recessed portion 48 extends along the direction of the tire rotation axis. Because the puncture repair agent used in the puncture repair flows along the direction of the tire rotation axis, it is possible to prevent retention of the puncture repair agent around the opening portion 42 of the protruding portion 44 by forming the recessed portion 48 along the direction of the tire rotation axis.

Figure 21:
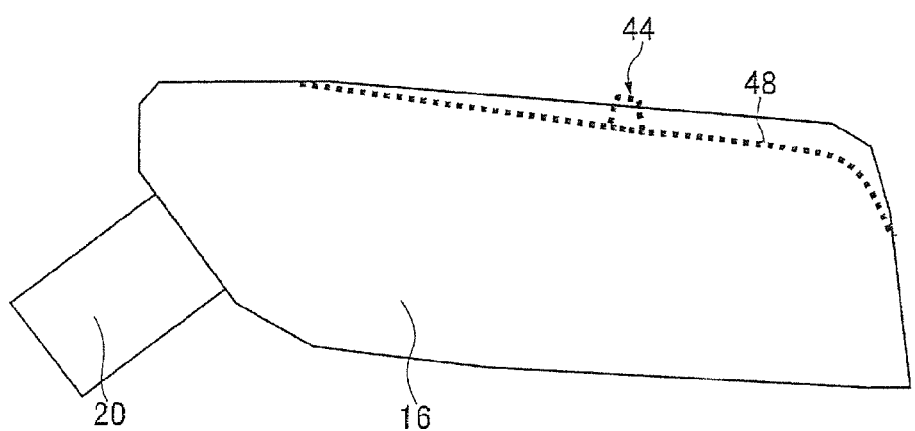
FIG. 21 is a sectional view of another example of the transmission device in the fourth embodiment.

Here, with reference to FIG. 21, the depth of the recessed portion 48 along the direction of the tire rotation axis will be described. FIG. 21 is a sectional view of the transmission device 16. A dotted line in FIG. 21 shows a bottom of the recessed portion 48 and the protruding portion 44. As illustrated in FIG. 21, the depth of the recessed portion 48 monotonously increases inward (toward the tire center line) in the direction of the tire rotation axis. Because the depth of the recessed portion 48 monotonously increases inward in the direction of the tire rotation axis, the puncture repair agent flows inward in the direction of the tire rotation axis and therefore it is possible to prevent retention of the puncture repair agent around the opening portion 42 of the protruding portion 44.

Effects of the protruding portion 44 of the transmission device 16 were studied as follows.

The transmission device 16 was provided in the tire cavity area of a tire 14, the size of which was 195/65R15, and the puncture repair agent (450 ml) was injected into the tire cavity area. The air pressure of the tire 14 was 200 kPa. The tire 14 was subjected to a tire running test at 30 km per hour by using an indoor drum test. After each running step for 30 minutes, the running was stopped, the tire pressure was reduced by 50 kPa, and the tire pressure was measured. The air pressure was obtained by using the monitoring device 18. If the correct air pressure was detected, i.e., if the pressure data indicated the reduction by 50 kPa, then the air pressure was increased by 50 kPa to the original air pressure and the tire was caused to run again. This process was repeated. In this tire running test, time that elapsed before it became impossible to measure the air pressure correctly was studied. If the air pressure could be measured correctly for over 10 hours of running, the device passed the test and was evaluated as being able to correctly measure the air pressure for many hours without problems even if the puncture repair agent was injected. An upper limit of the running time was 48 hours.

By using examples 1 to 5 and comparative examples 1 to 4 having the protruding portions 44 of different dimensions, the running time that elapsed before it became impossible to measure the air pressure correctly was studied.

For the protruding portions in the examples 1 and 2 and the comparative examples 3 and 4, the shape illustrated in FIGS. 7A and 7B was used. For the protruding portions in the examples 3 to 5 and the examples 1 and 2, the shape illustrated in FIG. 8C was used. The inclination angle q was 45 degree in each example. Other dimensions were used as illustrated in Table 1. The protruding portion 44 was oriented outward in the tire radial direction. The conventional example without the protruding portion 44 was also tested for the tire running time that elapsed before it became impossible to measure the air pressure correctly. After the running, the transmission device 16 was taken out and whether the puncture repair agent was adhered to the protruding portion 44 or the portion around the opening portion was checked visually.

An area ratio in the following Table 1 refers to a ratio of the area of the contact portion to the area of the opening portion. The contact portion represents a portion between the top portion of the protruding portion 44 and the contact plane in contact with the top portion of the protruding portion 44 and perpendicular to the protruding direction of the protruding portion 44. In the examples 1 and 2, the portion of the contact plane in contact with the top portion of the protruding portion 44 is a linear ridge at the top portion as illustrated in FIGS. 7A and 7B and therefore the area of this portion is 0 mm$^2$ and the area ratio is 0%.

Furthermore, effects of the water repellent treatment on the inclined face of the protruding portion 44 were studied.

For the protruding portion of the example 6, similarly to the example 2, the shape illustrated in FIGS. 7A and 7B was used, the protruding height was 1 mm, the opening area of the opening portion 42 was 0.39 mm$^2$, the inclination angle q was 45 degree, and the inclined face was subjected to the water repellent treatment. The result is illustrated in the following Table 2.

TABLE 2

|  | Example 2 | Example 6 |
|---|---|---|
| Protruding height (mm) of protruding portion | 1 | 1 |
| Inclination angle θ | 45° | 45° |
| Water repellant treatment | Not treated | Treated |
| Running time | 12 hours | 48 hours |
| Whether or not puncture repair agent is adhered to protruding portion (inclined face) | Adhered | Almost no agent adhered |

According to Table 2, the running time of the example 6 was 48 hours which is the upper limit and almost no puncture repair agent was adhered to the protruding portion 44. This indicates that it is preferable to make the inclined face water repellent.

Although the transmission device and the tire condition monitoring system according to the invention have been

TABLE 1

|  | Example 1 | Example 2 | Example 3 | Example 4 | Example 5 | Comparative example 1 | Comparative example 2 | Conventional example | Comparative Example 3 | Comparative Example 4 |
|---|---|---|---|---|---|---|---|---|---|---|
| Opening area of opening portion (mm$^2$) | 0.39 | ← | ← | ← | ← | ← | 0.50 | 1.19 | 0.39 | 0.50 |
| Area ratio (%) | 0 | ← | 10 | 20 | 30 | 35 | 20 | — | 0 | ← |
| Protruding height (mm) | 2.0 | 1.0 | 2.0 | ← | ← | ← | ← | 0.0 | 0.5 | 1.0 |
| Running time | 48 hours | 12 hours | 48 hours | 32 hours | 12 hours | 9 hours | 5 hours | 60 minutes | 8 hours | 5 hours |
| Whether or not puncture repair agent is adhered to portion around opening portion | Adhered | ← | ← | ← | ← | ← | ← | ← | Adhered | ← |

As is clear from Table 1, the running time in the examples 1 to 5 was 10 hours or longer and the air pressure could be measured correctly in each running step. On the other hand, the running time in the comparative examples 1 to 4 was shorter than 10 hours and the air pressure could not be measured correctly before a lapse of the 10-hour running time. This is assumed to be caused by the puncture repair agent that has closed the opening portion or the air vent. In the conventional example, the running time was 60 minutes.

From comparison between the examples 3 to 5 and the comparative examples 1 and 2, the air pressure can be measured correctly when the opening area of the opening portion 42 is 0.4 mm$^2$ or smaller and the area of the contact portion between the contact plane in contact with the top portion of the protruding portion 44 and the top portion is not larger than 30% of the area of the opening portion. At this time, from comparison between the examples 1 and 2 and the comparative examples 3 and 4, the air pressure can be measured correctly when the height of the protruding portion 44 is 1 mm or greater.

described above in detail, the transmission device and the tire condition monitoring system according to the invention are not limited to the embodiments described above but may be improved or modified in various ways without departing from the gist of the invention.

The invention claimed is:

1. A transmission device provided in a tire cavity area to transmit tire information about a condition of a tire, the transmission device comprising:
   a sensor configured to detect, as the tire information, a condition of gas filled in the tire cavity area surrounded with the tire and a rim;
   a transmitter configured to wirelessly transmits the detected tire information; and
   a housing which houses the sensor and the transmitter, the housing including a protruding portion protruding in a protruding direction from a surface of the housing, the protruding portion including a top portion defining an opening portion of an air vent connecting an inner space of the housing and the tire cavity area, the opening portion having an area of 0.4 mm² or smaller, a height of the protruding portion being 1 mm or greater, and an area of a contact portion between the top portion and a contact plane that is in contact with the top portion and perpendicular to a protruding direction of the protruding portion is not larger than 30% of the area of the opening portion.

2. The transmission device according to claim 1, wherein the opening portion is oriented outward in a tire radial direction of the tire.

3. The transmission device according to claim 1, wherein the protruding portion includes a water repellant inclined face between a base portion of the protruding portion and the top portion of the protruding portion.

4. The transmission device according to claim 1, wherein the protruding portion includes a protruding member fixed to the housing, the protruding member being an outer shell member in a frust-conical shape or a frust-pyramidal shape without a bottom face, and the opening portion is formed on a top portion of the frust-conical shape or the frust-pyramidal shape.

5. The transmission device according to claim 1, wherein the protruding portion includes an inclined face, such that an inclination angle of the inclined face between a base portion and the top portion of the protruding portion in the section is constant in a section profile of the protruding portion taken along a protruding direction of the protruding portion.

6. The transmission device according to claim 1, wherein the opening portion is an outer opening end of the air vent facing the tire cavity area and when the opening portion is configured as an outer opening portion, an inner opening portion of the air vent facing the inner space has a larger opening area than the outer opening portion.

7. The transmission device according to claim 6, wherein the opening area of the inner opening portion is at least four times the opening area of the outer opening portion.

8. The transmission device according to claim 6, wherein a hole sectional area of the air vent increases in a stepwise fashion or continuously from the outer opening portion toward the inner opening portion.

9. The transmission device according to claim 6, wherein when the protruding portion is cut along a plane including a central axis of the air vent, an inclined face of the protruding portion facing the tire cavity area protrudes toward the tire cavity area in a bulge shape.

10. The transmission device according to 6, wherein an edge of the inner opening portion of the air vent is chamfered or rounded.

11. The transmission device according to claim 6, wherein the inner space of the housing includes a sensor space which is provided at least between the air vent and the sensor and which a sensor face of the sensor faces, the sensor space being formed by an inner wall of an inner member provided in the housing and by an inner wall of the housing, the sensor space being narrower than an inner area surrounded with the inner wall of the housing and having a section widening from the inner opening portion of the air vent.

12. The transmission device according to claim 11, wherein
the wall of the housing and the inner wall of the inner member facing the inner space define a guide groove arrangement extending from the inner opening portion of the air vent.

13. The transmission device according to claim 12, wherein
the guide groove arrangement includes a plurality of grooves extending in different directions from the inner opening portion to a face of the wall of the housing facing the inner space.

14. The transmission device according to claim 12,
wherein the inner space includes a reservoir space for storing a liquid that has entered through the air vent, and the guide groove arrangement extends toward the reservoir space.

15. The transmission device according to claim 6, wherein
the inner space includes a reservoir space configured to store a liquid that has entered through the air vent;
the inner opening portion of the air vent is provided to a wall face of the reservoir space; and
the inner space further includes the sensor space which branches off from the wall face of the reservoir space and which the sensor face of the sensor faces.

16. The transmission device according to claim 1, wherein
the surface of the housing further includes a protecting wall which is 70% to 130% of the height of the protruding portion that protrudes from the surface of the housing.

17. The transmission device according to claim 16, wherein
the device is positioned in the tire cavity area of the tire so that a direction from the protruding portion toward a highest position of the protecting wall coincides with a tire circumferential direction of the tire.

18. The transmission device according to claim 16, wherein
the height of the protecting wall from the surface of the housing continuously changes along a direction of a tire rotation axis of the tire when the transmission device is positioned in the tire cavity area; and
an angle of an end portion of the protecting wall on a tire inner side in the direction of the tire rotation axis and rising from the surface of the housing while inclined is 45 degree or smaller.

19. The transmission device according to claim 16, wherein
a distance between the protecting wall and the protruding portion is 4 mm to 20 mm.

20. The transmission device according to claim 16, wherein
the surface of the housing between the protecting wall and the protruding portion is water repellent.

21. The transmission device according to claim 1, wherein
the housing is partially recessed to form a recessed portion;
the recessed portion includes the protruding portion; and
a depth of the recessed portion is 70% to 130% of the height of the protruding portion.

22. The transmission device according to claim 21, wherein
the recessed portion extends in a recess direction and the transmission device is positioned in the tire cavity area so that the recess direction coincides with a direction of a tire rotation axis of the tire.

23. The transmission device according to claim 22, wherein
the depth of the recessed portion monotonously increases toward the a inner side in the direction of the tire rotation axis when the transmission device is positioned in the tire cavity area.

24. A tire condition monitoring system comprising:
a transmission device including:
a sensor configured to detect, as tire information, a condition of gas filled in a tire cavity area surrounded with a tire and a rim;

a transmitter configured to wirelessly transmits the detected tire information; and a housing which houses the sensor and the transmitter, the housing including a protruding portion protruding in a protruding direction from a surface of the housing, the protruding portion including a top portion defining an opening portion of an air vent connecting an inner space of the housing and the tire cavity area, the opening portion having an area of 0.4 mm$^2$ or smaller, a height of the protruding portion being 1 mm or greater, and an area of a contact portion between the top portion and a contact plane that is in contact with the top portion and perpendicular to a protruding direction of the protruding portion is not larger than 30% of the area of the opening portion;

a receiving device configured to receive the tire information transmitted from the transmitter; and a monitoring section configured to determine whether a tire anomaly exists based on the tire information and provide a determination result.

* * * * *